(12) United States Patent
Tavares

(10) Patent No.: US 9,741,030 B2
(45) Date of Patent: Aug. 22, 2017

(54) SYSTEMS AND METHODS TO IDENTIFY MERCHANTS

(71) Applicant: Visa International Service Association, San Francisco, CA (US)

(72) Inventor: Silvio Orlando Renaud Tavares, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 661 days.

(21) Appl. No.: 14/191,156

(22) Filed: Feb. 26, 2014

(65) Prior Publication Data

US 2014/0337205 A1   Nov. 13, 2014

Related U.S. Application Data

(63) Continuation of application No. 13/889,970, filed on May 8, 2013, now Pat. No. 8,706,557.

(51) Int. Cl.
 *G06Q 40/00* (2012.01)
 *G06Q 20/32* (2012.01)
 (Continued)

(52) U.S. Cl.
 CPC .......... *G06Q 20/322* (2013.01); *G06Q 20/10* (2013.01); *G06Q 20/20* (2013.01); *G06Q 20/204* (2013.01);
 (Continued)

(58) Field of Classification Search
 None
 See application file for complete search history.

(56) References Cited

U.S. PATENT DOCUMENTS 5,930,830 A   7/1999 Mendelson et al.
6,381,582 B1  4/2002 Walker et al.
(Continued)

OTHER PUBLICATIONS

Systems and Methods to Communication Via a Merchant Aggregator, U.S. Appl. No. 13/624.778, filed Sep. 21, 2012, Christopher Magpayo, et al, Apr. 23, 2015.
(Continued)

*Primary Examiner* — F. Zeender
*Assistant Examiner* — Christopher Buchanan
(74) *Attorney, Agent, or Firm* — Greenberg Traurig, LLP

(57) ABSTRACT

A system and method including a mobile application installed on a mobile device and configured to authenticate a merchant represented by a unique identifier, determine a position of the mobile device while the mobile device is co-located with a transaction terminal of the merchant, communicate the position to a portal to associate the position with the unique identifier and to receive an account number, and provide the account number to generate an authorization request on the transaction terminal. The authorization request includes a terminal identifier of the transaction terminal. When the authorization request generated using the account number is detected, the association between the account number provided to the mobile application and the location received from the mobile application is replaced with the association between the terminal identifier extracted from the authorization request and the location. Thus, subsequent authorization requests generated by the transaction terminal can be determined to contain the terminal identifier and identified to be associated with the location and the merchant identifier.

19 Claims, 12 Drawing Sheets

(51) Int. Cl.
*G06Q 20/20* (2012.01)
*G06Q 20/10* (2012.01)
*G06Q 20/38* (2012.01)

(52) U.S. Cl.
CPC ..... *G06Q 20/3224* (2013.01); *G06Q 20/3278* (2013.01); *G06Q 20/385* (2013.01)

(56) References Cited

U.S. PATENT DOCUMENTS

| | | | |
|---|---|---|---|
| 6,868,391 B1 | 3/2005 | Hultgren | |
| 7,536,349 B1 | 5/2009 | Mik et al. | |
| 8,055,581 B2 | 11/2011 | Royyuru et al. | |
| 8,561,896 B2 | 10/2013 | Hammond et al. | |
| 8,612,317 B1 | 12/2013 | Harman et al. | |
| 8,620,738 B2 | 12/2013 | Fordyce, III et al. | |
| 8,639,587 B1 | 1/2014 | Whang | |
| 8,706,557 B1 | 4/2014 | Tavares | |
| 8,708,233 B2 | 4/2014 | Hammond et al. | |
| 8,738,418 B2 | 5/2014 | Winters | |
| 8,781,889 B2 | 7/2014 | Walker et al. | |
| 8,843,391 B2 | 9/2014 | Fordyce, III et al. | |
| 9,159,084 B2 | 10/2015 | Magpayo et al. | |
| 2008/0249938 A1* | 10/2008 | Drake-Stoker | G06Q 20/12 705/44 |
| 2009/0048916 A1 | 2/2009 | Nuzum et al. | |
| 2009/0228365 A1 | 9/2009 | Tomchek et al. | |
| 2009/0234773 A1* | 9/2009 | Hasson | G06Q 20/20 705/44 |
| 2010/0057786 A1 | 3/2010 | Hardy-McGee | |
| 2011/0022424 A1* | 1/2011 | VonDerheide | G01C 21/20 705/5 |
| 2011/0087550 A1 | 4/2011 | Fordyce, III et al. | |
| 2011/0106709 A1* | 5/2011 | Puura | G06Q 20/20 705/64 |
| 2011/0191252 A1 | 8/2011 | Dai | |
| 2011/0231223 A1 | 9/2011 | Winters | |
| 2011/0264543 A1 | 10/2011 | Taveau et al. | |
| 2012/0005076 A1 | 1/2012 | Dessert et al. | |
| 2012/0078751 A1* | 3/2012 | MacPhail | G06Q 20/06 705/26.41 |
| 2012/0158528 A1* | 6/2012 | Hsu | G06Q 20/20 705/16 |
| 2012/0203663 A1 | 8/2012 | Sinclair et al. | |
| 2012/0203666 A1 | 8/2012 | Torossian et al. | |
| 2013/0046635 A1 | 2/2013 | Grigg et al. | |
| 2013/0066782 A1 | 3/2013 | Diamond | |
| 2013/0073464 A1 | 3/2013 | Magpayo et al. | |
| 2013/0124417 A1 | 5/2013 | Spears et al. | |
| 2013/0132196 A1 | 5/2013 | Hurst | |
| 2013/0185166 A1 | 7/2013 | Larkin | |
| 2013/0185192 A1 | 7/2013 | McGuire | |
| 2013/0211900 A1 | 8/2013 | Dessert | |
| 2013/0246203 A1 | 9/2013 | Laracey | |
| 2013/0275303 A1 | 10/2013 | Fiore et al. | |
| 2013/0290707 A1 | 10/2013 | Sinclair et al. | |
| 2014/0095384 A1* | 4/2014 | Basha | G06Q 20/385 705/44 |
| 2015/0356556 A1 | 12/2015 | Celikyilmaz et al. | |
| 2015/0356690 A1 | 12/2015 | Celikyilmaz et al. | |

OTHER PUBLICATIONS

Electronic Transaction System, U.S. Appl. No. 14/729,537, filed Jun. 3, 2015, Ilker Celikyilmaz, et al, Jul. 13, 2016.

Systems and Methods to Detect Changes in Merchant Identification Information, U.S. Appl. No. 14/734,342, filed Jun. 9, 2015, Ilker Celikyilmaz, et al, Mar. 9, 2016.

International Patent Application PCT/US2015/034123, International Search Report and Written Opinion, Aug. 24, 2015.

* cited by examiner

SYSTEMS AND METHODS TO IDENTIFY MERCHANTS

RELATED APPLICATIONS

The present application is a continuation application of U.S. patent application Ser. No. 13/889,970, filed May 8, 2013 and entitled "SYSTEMS AND METHODS TO IDENTIFY MERCHANTS", the entire disclosure of which is hereby incorporated herein by reference.

The present application relates to U.S. patent application Ser. No. 13/624,778, filed Sep. 21, 2012, assigned U.S. Pat. App. Pub. No. 2013/0073464, and entitled "Systems and Methods to Communicate via a Merchant Aggregator", the entire disclosure of which is incorporated herein by reference.

FIELD OF THE TECHNOLOGY

At least some embodiments of the present disclosure relate to user identification, the processing of transaction data, such as records of payments made via credit cards, debit cards, prepaid cards, etc., and/or providing information based on the processing of the transaction data.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," and U.S. Pat. No. 6,055,573, issued Apr. 25, 2000 and entitled "Communicating with a Computer based on an Updated Purchase Behavior Classification of a Particular Consumer", discloses systems in which a targeted advertisement is delivered to a computer in response to receiving an identifier, such as cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
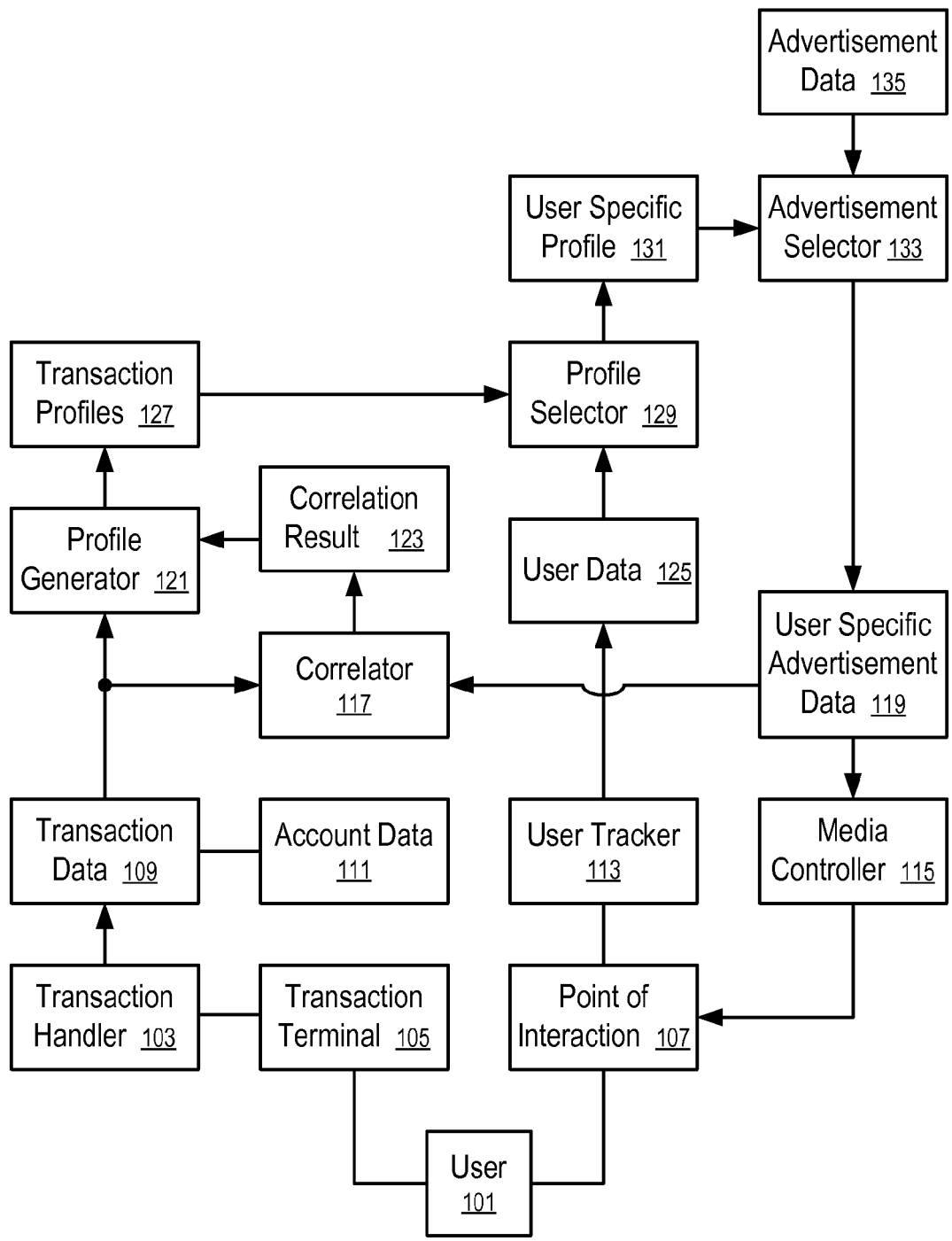
FIG. 1 illustrates a system to provide services based on transaction data according to one embodiment.

A mobile application running on a mobile device can be used to establish the connection between a terminal identifier of a transaction terminal used in processing payment transactions of a merchant, the location of the transaction terminal configured in a payment processing network, and an identity of the merchant used outside the payment processing network. For example, the mobile application can be configured to authenticate the merchant represented by a unique identifier outside the payment processing network.

After the merchant is authenticated and while the mobile device is co-located with the transaction terminal, the mobile application determines a position of the mobile device. Thus, the position determined by the mobile application represents a location of the transaction terminal. The mobile application provides the location to a portal for association with the unique identifier of the merchant, and receives an account number from the portal to allow the portal to temporarily establish the association between the account number received in the mobile application and the location of transaction terminal determined by the mobile application. After the account number is used on the transaction terminal to initiate an authorization request for a transaction, the authorization request made using the account number is identified to extract the terminal identifier transmitted in the authorization request. The association between the account number and the location of the transaction terminal is then replaced with the association between the terminal identifier and the location. Thus, subsequent authorization requests containing the terminal identifier can be identified as being submitted for transactions at the location with the merchant represented by the unique identifier. Some details and examples are provided in the section entitled "MERCHANT IDENTIFICATION."

For example, transaction data, such as records of transactions made via credit accounts, debit accounts, prepaid accounts, bank accounts, stored value accounts and the like, can be processed to optionally provide information for various services, such as reporting, benchmarking, advertising, content or offer selection, customization, personalization, prioritization, etc. In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data and/or the user data linked via the transaction data, an advertising network can present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. The transaction handler may be further automated to process the advertisement fees charged to the advertisers, using the accounts of the advertisers, in response to the advertising activities. Some of the services are discussed in the section entitled "TRANSACTION DATA BASED SERVICES."

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES."

For example, the computing apparatus can be configured to provide transaction information about transactions between enrolled merchants and enrolled account holders to a merchant aggregator, which enrolls the merchants and account holders for enhanced communications with merchants and account holders. The transaction information is provided in real time or concurrently with the processing of the respective transaction requests at the transaction handler. Details and examples in one embodiment regarding the communication via the merchant aggregator are provided in the section entitled "MERCHANT AGGREGATOR."

The computing apparatus may correlate transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements.

For example, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc. The correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

Merchant Identification

Figure 4:
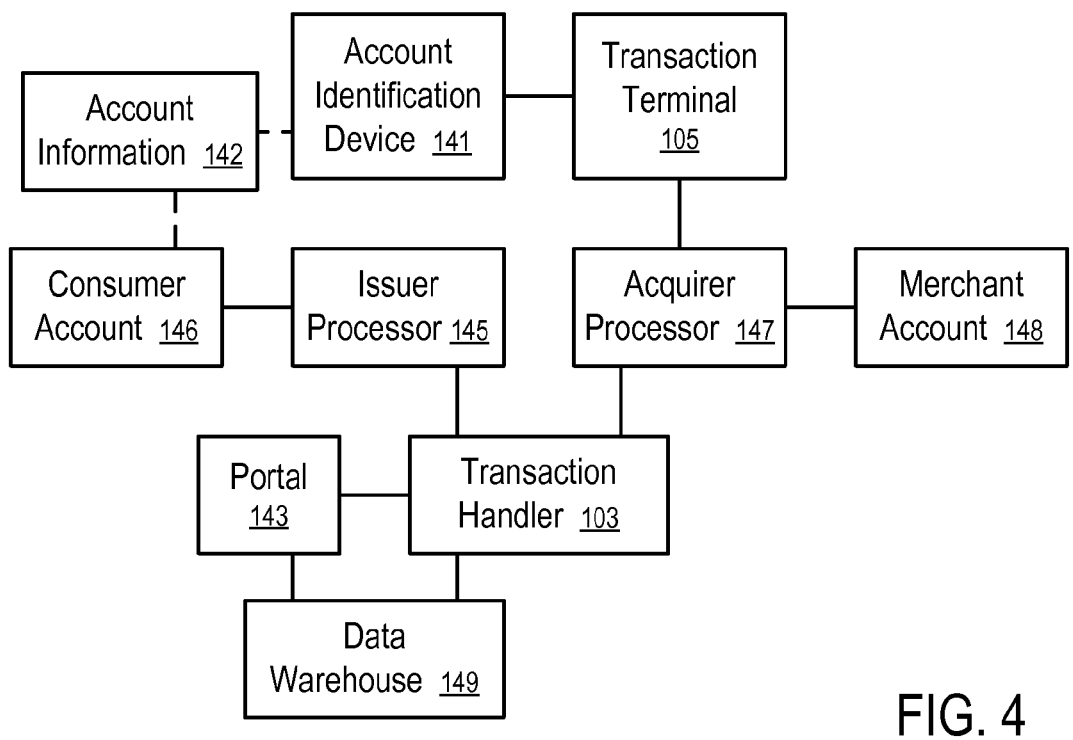
FIG. 4 shows a system to provide information based on transaction data according to one embodiment.

In a payment transaction processing network, such as a system partially illustrated in FIG. 4 and further discussed in the section entitled "TRANSACTION PROCESSING AND DATA," a merchant may be represented by a merchant account (148). A transaction terminal (105) of the merchant has a terminal identifier that identifies the merchant account (148) in the payment transaction processing network. The system may store merchant information in association with the merchant account, such as a business name of the merchant, a business address of the merchant, etc.

However, in a large payment transaction processing network, it can be a challenging task to efficiently and accurately identify a particular merchant based on merchant information such as business name and/or business address, when the merchant information is submitted by a human user.

For example, a merchant may have a plurality of different business names. A business name associated with a merchant account (148) in the payment transaction processing system may be different from a business name typically used by the merchant in doing business outside the payment transaction processing system. For example, a merchant may use business names with slightly different spelling or wording in different business situations. For example, the business name of a merchant may be changed but not updated promptly in a data warehouse (149) that stores the merchant information for the merchant account (148). Some merchants have similar or same business names.

Further, it is desirable to have accurate location information of the transaction terminals (e.g., 105) of the merchants to provide location related services in connection with payment transaction processing.

Figure 14:
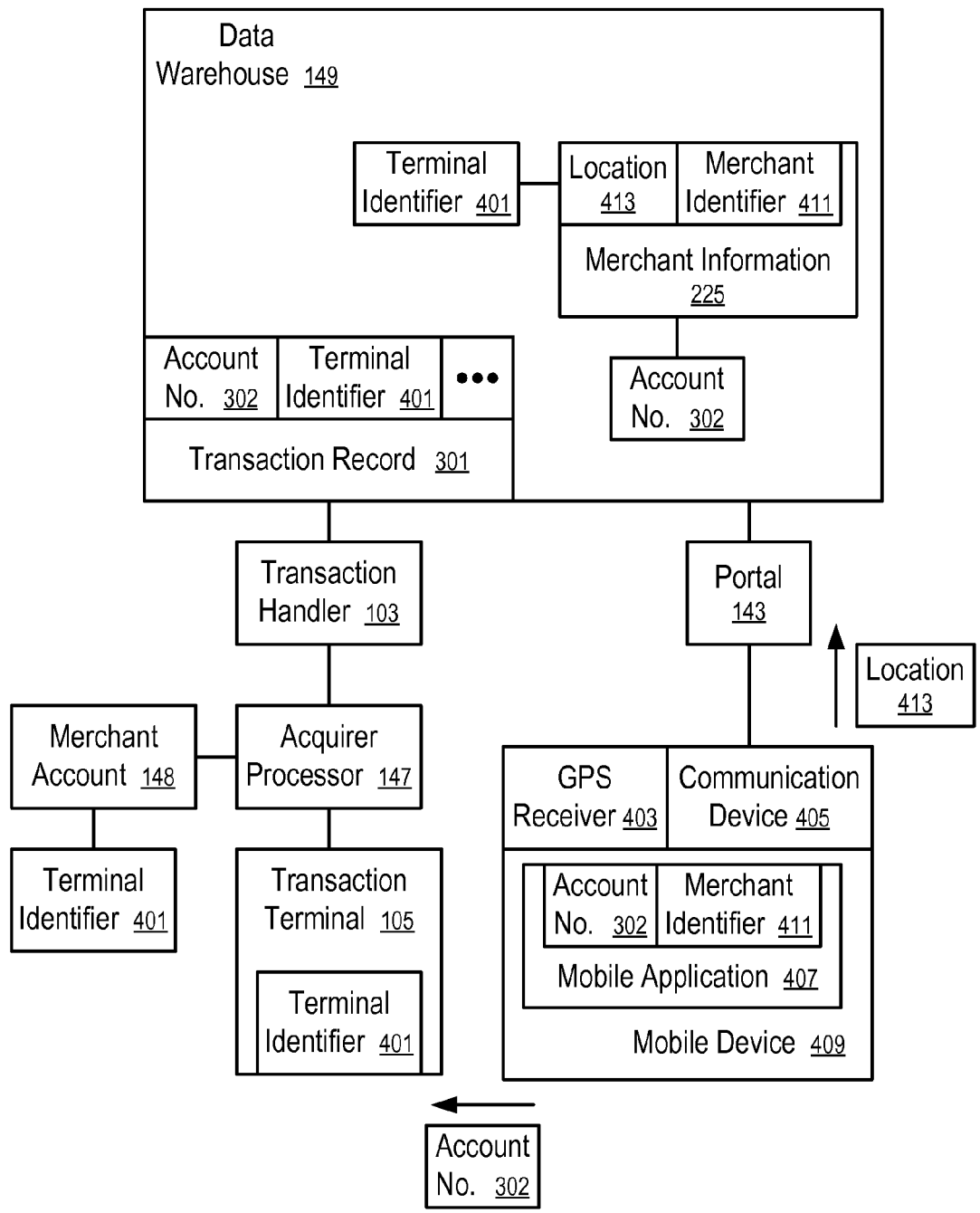
FIG. 14 shows a system to identify a merchant according to one embodiment.

FIG. 14 shows a system to identify a merchant according to one embodiment.

In FIG. 14, a mobile device (409) is configured with a mobile application (407) to facilitate the identification of the merchant. The mobile application (407) can be provided via, for example, downloading it from a portal (143) or an application store configured to deliver mobile applications to certain mobile devices (409).

In FIG. 14, the mobile device (409) includes a global positioning system (GPS) receiver (403) to determine the current position of the mobile device (409). When the mobile device (409) is positioned near the transaction terminal (105) of the merchant, or co-located with the transaction terminal (105), the position determined by the GPS receiver (403) can be used as the position of the transaction terminal (105).

Alternatively or in combination, the mobile device (409) may determine the current position of the mobile device (409) cellular communications signals, wireless local area communications signals, and/or an interactive map.

In FIG. 14, the mobile device (409) includes a communication device (405) configured to communicate with the portal (143) via a wired communication connection and/or a wireless communication connection. For example, the communication device (405) may include a wireless local area network transceiver configured to use a wireless local area network connection to connect to the Internet for communication with the portal (143). For example, the communication device (405) may include a cellular communications transceiver configured to use a cellular telecommunications connection to connect to the Internet for communication with the portal (143).

In FIG. 14, the mobile device (409) is configured to communicate with the portal (143) to authenticate the merchant using the mobile application (407) running in the mobile device (409).

Figure 9:
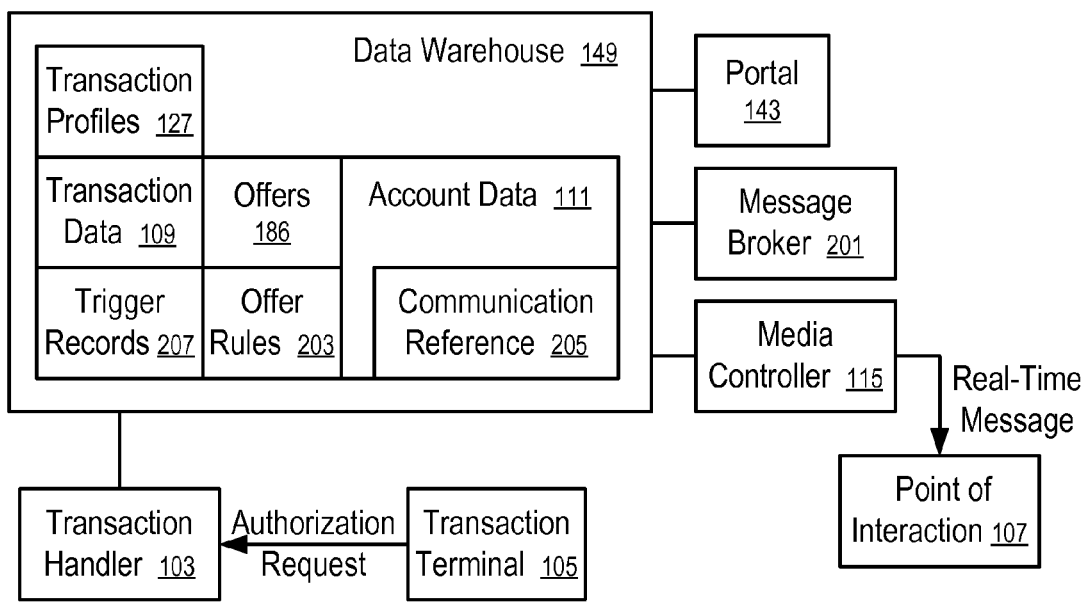
FIG. 9 shows a system to provide real-time messages according to one embodiment.
Figure 11:
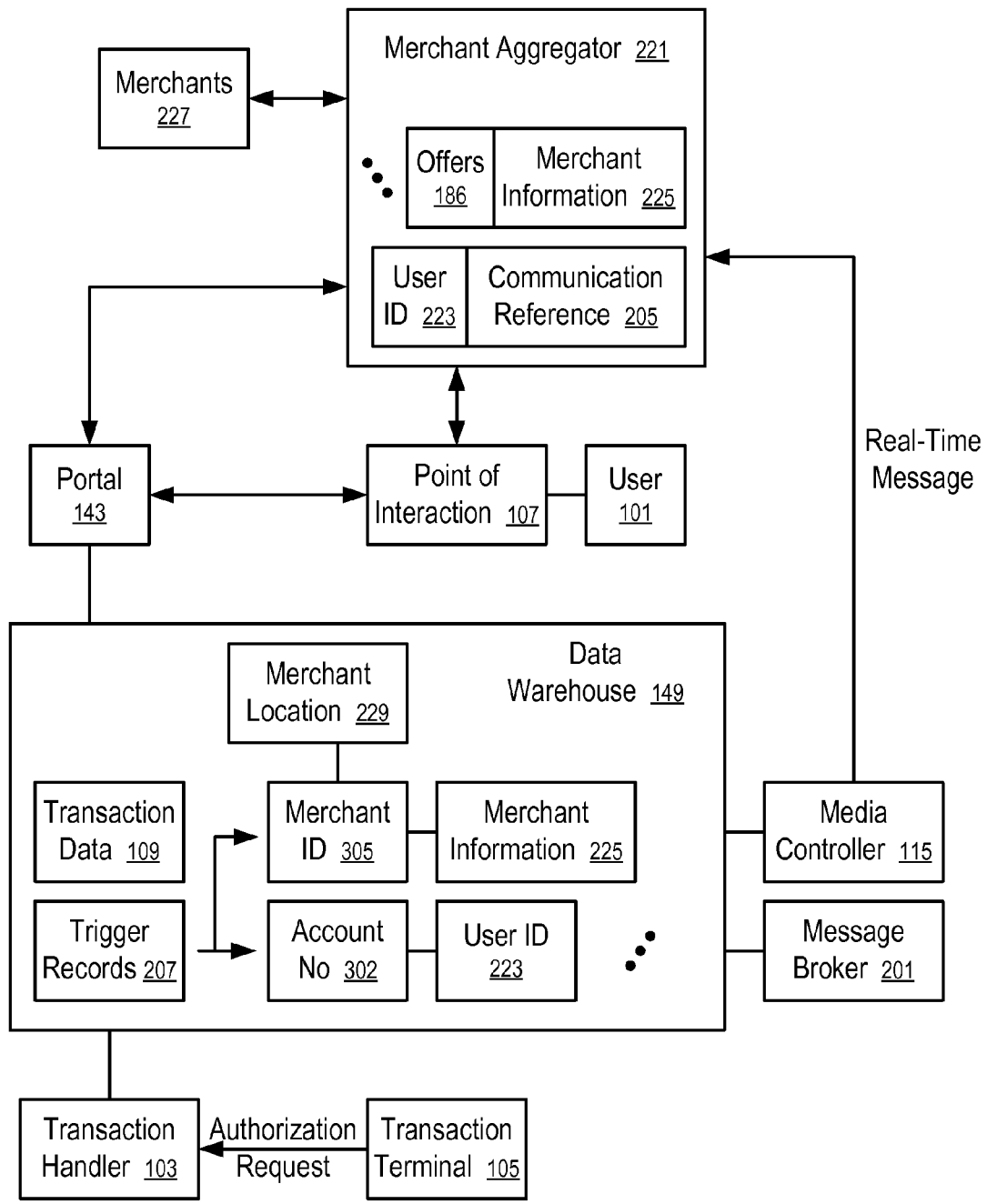
FIG. 11 shows a system configured to communicate via a merchant aggregator according to one embodiment.

For example, when the merchant participates in an offer program (e.g., by providing an offer (186) illustrated in FIG. 9 or FIG. 11), a unique merchant identifier (411) can be assigned to represent the merchant. The merchant identifier (411) is configured to uniquely identify the merchant among a plurality of merchants in the system, such as merchants identified in the data warehouse (149).

Access to merchant information (225) and/or services related to the unique merchant identifier (411) can be protected via credential information such as username and password. The mobile application (407) is configured to authenticate the merchant based on the credential information.

The merchant identifier (411) can be assigned to the merchant when the merchant installs and/or configures the mobile application (407) on the mobile device (409). For example, after the merchant signs up for the services provided by the portal (143), the merchant is prompted to set up username and password. After the merchant passes authentication operations on the mobile application (407), the merchant identifier (411) is stored in the mobile application (407) or mobile device (409) to represent the merchant.

For example, when the merchant enrolls in a program with a merchant aggregator (221) illustrated in FIG. 11, the merchant identifier (411) can be assigned to identify the merchant in both the merchant aggregator (221) and the data warehouse (149).

The mobile application (407) can be configured to instruct the merchant to position the mobile device (409) at or near the transaction terminal (105) to obtain a location (413) of the mobile device (409) that represents the location of the transaction terminal (105). The mobile application (407) then transmits the location (413) to the portal (143) for association with the merchant identifier (411) in the data warehouse (149).

In FIG. 14, the portal (143) is configured to provide an account number (302) to the mobile application (407) in response to receiving the location (413). The portal (143) stores data in the data warehouse (149) to temporarily associate the account number (302) to the location (413).

In FIG. 14, the account number (302) is independent from the merchant account (148) in which the merchant receives payments processed by an acquirer processor (147) on behalf of the merchant. The account number (302) assigned to temporarily represent the location (413) and/or the merchant identifier (411) in the data warehouse (149) can be a one-time account number, or be set to expire within a short period of time.

The period of time in which the account number (302) can be reduced to such that if the mobile device (409) is in close proximity to the transaction terminal (105), the account number (302) presented by the mobile application (407) can be used on the transaction terminal (105) to initiate a transaction within the period of time, and if the mobile device (409) is not in close proximity to the transaction terminal (105), it would be difficult to use the account number (302) presented by the mobile application (407) on the transaction terminal (105) to initiate a transaction within the period of time in which the account number (302) is valid.

For example, the mobile application (407) may display the account number (302) to allow the merchant to key in the account number (302) on the transaction terminal (105) to initiate an authorization request for a transaction in an account uniquely identified by the account number (302).

For example, the mobile application (407) may include a near field communication device that is configured to communicate the account number (302) to the transaction terminal (105) via near field communication. When the mobile device (409) and the transaction terminal (105) are in range for near field communication, the location (413) of the mobile device (409) as determined by the mobile device (409) represents an accurate measurement of the location (413) of the transaction terminal (105). The mobile application (407) can be configured to determine the location (413) for transmission to the portal (143) while the mobile device (409) and the transaction terminal (105) are in range for near field communication, such as before, during, or after the communication of the account number (302) to the transaction terminal (105) via near field communication.

In some implementations, the mobile device (409) can be configured to establish a wired or wireless communication connection with the transaction terminal (105) to provide the account number (302). Examples of such a communication connection include a Bluetooth connection, a personal wireless area network communication connection, a Universal Serial Bus (USB) connection, etc. The use of a wired communication connection or a wireless connection of a short communication range can improve the accuracy of the location (413) measured using the location determination system of the mobile device (409), such as the GPS receiver (403).

In FIG. 14, the transaction terminal (105) has a terminal identifier (401) that is associated with the merchant account (148) in the payment transaction processing network interconnected by a transaction handler (103). After the authorization request for the transaction made on the transaction terminal (105) using the account number (302) provided via the mobile application (407) is processed by the transaction handler (103), a transaction record (301) for the transaction is generated and stored in the data warehouse (149) that is coupled with both the transaction handler (103) and the portal (143). The transaction record (301) includes the account number (302) provided to the transaction terminal (105) via the mobile application (407) and the terminal identifier (401) of the transaction terminal (105).

If the transaction corresponding to the transaction record (301) is determined to be valid (e.g., within the predetermined time period in which the account number (302) is valid and associated with the location (413), within the predetermined limit on number of uses of the account number (302)), the portal (143) and/or the transaction handler (103) (or a separate computing device) extracts the terminal identifier (401) from the transaction record (301) and stores data in the data warehouse (149) to associate the terminal identifier (401) with the location (413) measured for the transaction terminal (105) and the merchant identifier (411).

After the temporary association between the account number (302) and merchant information (225) is replaced in the data warehouse (149) with the association between the terminal identifier (401) and the merchant information (225), the merchant information (225) can be identified and used for transactions initiated on the transaction terminal (105) of the merchant. When a subsequent transaction includes the terminal identifier (401), the transaction can be identified to be at the location (413) and with the merchant represented by the merchant identifier (411).

For example, if an offer (186) (e.g., illustrated in FIG. 9 or 11) requires a payment transaction with the merchant identified by the merchant identifier (411), the transaction handler (103) and/or the portal (143) can be configured to detect such a payment transaction based on the terminal identifiers (e.g., 401) associated with the merchant identifier (411).

The merchant may have a plurality of transaction terminals (e.g., 105), and the mobile application (411) can be used multiple times to measure the locations (e.g., 413) of the transaction terminal (e.g., 105), associate the measured locations (e.g., 413) with the terminal identifiers (e.g., 401) of the respective transaction terminals (e.g., 105), and associate the terminal identifiers (e.g., 401) of the merchant with the merchant identifier (411) of the merchant.

The portal (143) may provide different one-time account numbers (e.g., 302) for identification of the different transaction terminals (e.g., 105) of the merchant. Alternatively, the account number (302) may be configured to be valid for use multiple times within a period of time.

When the account number (302) can be used multiple times on different transaction terminals (e.g., 105) of the merchant, the system may be configured to measure one location (413) representing the set of the transaction terminals (e.g., 105). Alternatively, the transaction handler (103) and/or the portal (143) may correlate the transactions initiated on the transaction terminals (e.g., 105) and local measurements based on time sequence.

For example, the mobile application (407) may provide the account number (302) to initiate an authorization request for a transaction on the transaction terminal (105) and report the location (413) measured for the transaction terminal (105) within a short period of time (e.g., shorter than a time period for the merchant to move the mobile device to another transaction terminal). Thus, the authorization request generated from the transaction terminal (105) can be corrected to the location (413) measured from the transaction terminal (105) based on the timestamp associated with the reporting of the measured location (413) and the timestamp of the authorization request.

Alternatively or in combination, different transaction amounts can be used to tell the different transaction terminals (105) apart. For example, during the identification of the transaction terminal (105), the mobile application (407) presents not only the account number (302), but also the transaction amount of the transaction to be initiated on the transaction terminal (105). Thus, the transaction for the particular transaction terminal (105) can be identified based on the combination of the transaction amount and the account number (302).

Figure 15:
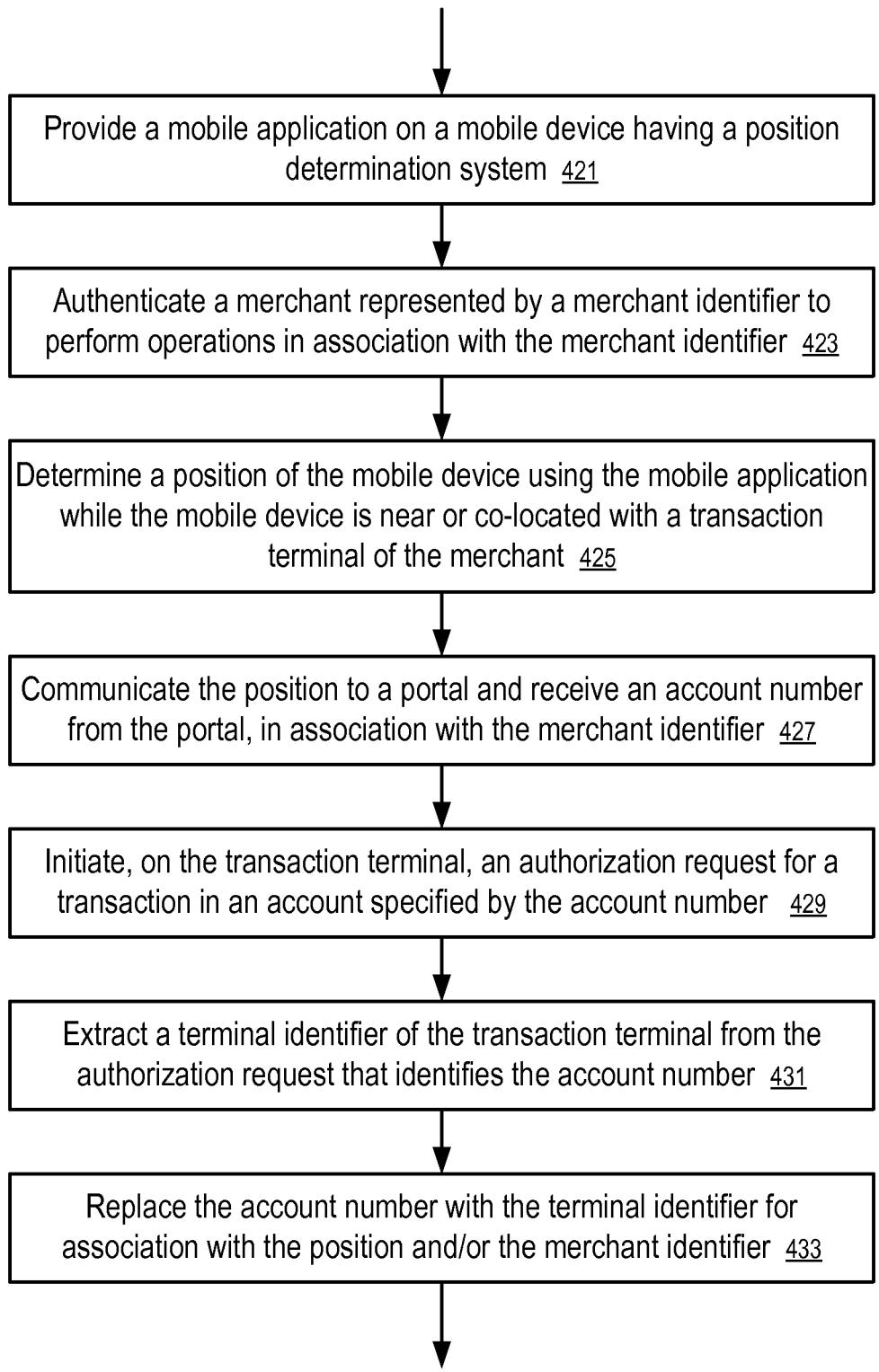
FIG. 15 shows a method to identify a merchant according to one embodiment.

FIG. 15 shows a method to identify a merchant according to one embodiment. For example, the method of FIG. 15 can be implemented in a system illustrated in FIG. 14. The data associating the terminal identifier (401) with the merchant information (225) can be used in systems illustrated in other figures, such as FIGS. 1, 9, 11 and/or 12.

In FIG. 15, a computing apparatus/system is configured to: provide (421) a mobile application (407) on a mobile device (409) having a position determination system (e.g., GPS receiver (403)); authenticate (423), using the mobile application (407), a merchant represented by a merchant identifier (411) to perform operations in association with the merchant identifier (411); determine (425) a position of the mobile device (409) using the mobile application (407) while the mobile device (409) is near or co-located with a transaction terminal (401) of the merchant, such that the position can be used as a measurement of the location (413) of the transaction terminal (401); in association with the merchant identifier (411), communicate (427) the position (e.g., location (413)) to a portal (143) and receive an account number (302) from the portal; initiate (429), on the transaction terminal (105), an authorization request for a transaction in an account specified by the account number (302); extract (431) a terminal identifier (401) of the transaction terminal (105) from the authorization request that identifies the account number (302); and replace (433) the account number (302) with the terminal identifier (401) for association with the position (e.g., location (413)) and/or the merchant identifier (411).

The computing apparatus/system may include one or more of the portal (143), the data warehouse (149), the mobile device (409), the transaction terminal (105), and the transaction handler (103).

Figure 7:
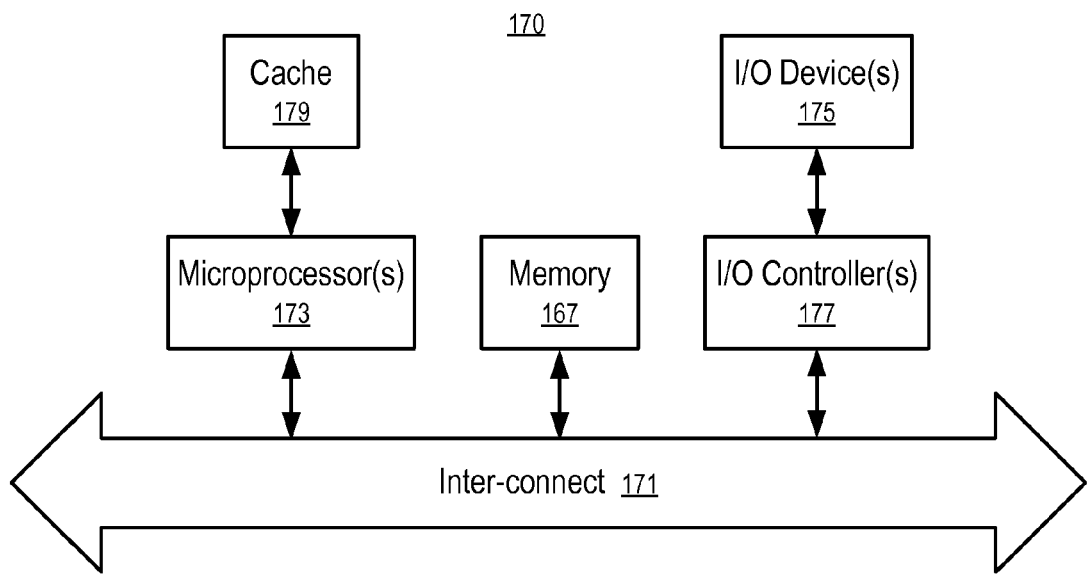
FIG. 7 illustrates a data processing system according to one embodiment.

For example, the computing system can be implemented using one or more data processing systems illustrated in FIG. 7, each of which has at least one microprocessor (173) and memory (167) storing instructions configured to instruct the at least one microprocessor to perform operations. The computing system may include: a transaction handler (103) configured to process payment transactions in a payment processing network and generate transaction data (106)

recording the payment transactions processed by the transaction handler; and a portal (143) configured to communicate with a mobile application (407) executing in a mobile device (409) having a communication device (405) and a GPS receiver (403), where the mobile application (407) is configured to instruct the GPS receiver (403) to determine a position (e.g., location (413)) of the mobile device (409) while the mobile device (409) is positioned in the vicinity of a transaction terminal (105) of a merchant, authenticating the merchant represented by a merchant identifier (411). After the merchant is authenticated via the mobile application (407), the portal (143) communicates with the mobile application (407), via the communication device (405), to receive the position (e.g., location (413)) from the mobile application (407) and provides an account number (302) to the mobile application (407) for the initiation of a transaction on the transaction terminal (105).

The computing system may further include a data warehouse (149) coupled with the portal (143) and the transaction handler (103) to store merchant information (225), including the position (e.g., location (413)) received from the mobile application (407), where the position (e.g., location (413)) is stored in association with the merchant identifier (411) that uniquely identifies the merchant among a plurality of merchants in the data warehouse (149). The data warehouse (149) may further store first data associating the account number (302) with the merchant information (225), and a transaction record (301) of the transaction initiated, on the transaction terminal (105) of the merchant, using the account number (302) while the account number (302) is associated with the merchant information (225), where the transaction record (301) includes the account number (302) and the terminal identifier (401) of the transaction terminal (105).

The computing system is configured, via instructions, to identify the transaction record (301) based on the account number (302), extract the terminal identifier (401) from the identified transaction record (301), identify the merchant information (225) that is associated with the account number (302) in the data warehouse (149), and store in the data warehouse (149) second data associating the terminal identifier (401) with the merchant information (225).

The computing system may remove the first data associating the account number (302) with the merchant information (225), after the second data associating the terminal identifier (401) with the merchant information (225) is stored in the data warehouse (149).

The computing system can be further configured to: detect a subsequent transaction initiated on the transaction terminal (105) having the terminal identifier (401); determine the terminal identifier (401) used in the subsequent transaction; and determine the location (413) of the subsequent transaction and the merchant identifier (411) of the subsequent transaction based on matching the terminal identifier (401) used in the subsequent transaction and the terminal identifier (401) in the second data.

The account number (302) can be, for example, a one-time account number (302) valid for one time use. The one-time account number (302) can be generated in response to receiving the location (413) from the mobile application (407), or in anticipation of the mobile application (407) submitting the location (413).

The mobile device can be configured, for example, to present the account number (302) on a display device and determine the position (e.g., location (413)) of the mobile device (409) while the account number (302) is presented on the display device. The time period of the display of the account number (302) on the mobile application (407) can be limited to encourage the determination of the position (e.g., location (413)) of the mobile device (409) in the vicinity of the transaction terminal (105).

The mobile device (409) can be configured to communicate the account number (302) to the transaction terminal (105) via near field communication, and determine the position of the mobile device (409) as the measured location (413) of the transaction terminal (105) while the mobile device (409) and the transaction terminal (105) are in communication range for near field communication.

The mobile device (409) can also be implemented using a data processing system illustrated in FIG. 7. For example, the mobile device (409) includes a communication device (405), a GPS receiver (403), at least one microprocessor (173) coupled with the communication device (405) and the GPS receiver (403), and memory (167) storing instructions configured to instruct the at least one microprocessor (173) to perform operations. The instructions include a mobile application (407) configured to: authenticate a merchant represented by a merchant identifier (411); determine, using the GPS receiver (403), a location (413) of the mobile device (409) while the mobile device (409) is positioned in the vicinity of a transaction terminal (105) of the merchant; and communicate, using the communication device (405), with the portal (143) to provide the location (413) in association with the merchant identifier (411), and to receive an account number (302) for the initiation of a transaction using the transaction terminal (105).

The portal (143) is coupled with a data warehouse (149) storing transaction data (109) (as illustrated in FIG. 1) recording payment transactions processed by the transaction handler (103) of a payment processing network, and the data warehouse (149) is coupled with the portal (143) and the transaction handler (103) to store: merchant information (225), such as the location (413) received from the mobile application (407) and the merchant identifier (411); first data associating the account number (302) with the merchant information (225), before a terminal identifier of the transaction terminal (106) of the merchant replaces it with the account number (302); and a transaction record (301) of the transaction initiated using the account number (302) on the transaction terminal (105) of the merchant while the account number (302) is associated with the merchant information (225), where the transaction record (301) includes the account number (302) and a terminal identifier (401) of the transaction terminal (401).

The portal (143) can be configured to identify the transaction record (301) having the account number (302), extract the terminal identifier (401) from the transaction record (301), identify the merchant information (225) associated with the account number (302) in the data warehouse (149) in accordance with the first data, and store in the data warehouse (149) second data associating the terminal identifier (401) with the merchant information (225).

The account number (302) may be set to be valid for one time use within a predetermined period of time. The mobile device (407) may further include a display device, on which the mobile application (409) is configured to present the account number (302) while determining the location (413) of the mobile device (409).

The account number (302) may be displayed at least in a bar code format such that a bar code scanner of the transaction terminal (105) can read the account number (302). Alternatively, the transaction terminal (105) may include a key pad to receive manual input of the account number (302) from the person using the mobile device (409). Alternatively, the mobile device (409) may include a near field communication device configured to communicate/present the account number (302) to the transaction terminal (105) to initiate the transaction corresponding to the transaction record (301). When the near field communication device (405) is used, the mobile device (409) can be configured to determine and report the location (413) of the mobile device (409) while the mobile device (409) and the transaction terminal (105) are in communication range for near field communication.

In some instances, the mobile device (409) may be integrated within the transaction terminal (105); and the mobile application (407) can be downloaded and installed on the transaction terminal (105) to perform the operations described herein.

The mobile application (407) may be provided by the portal (143) for installation on the mobile device (409) of the merchant. The merchant is prompted to provide input to the mobile application (407) to authenticate that a user of the mobile application (407) is authorized by the merchant represented by a merchant identifier (411) that uniquely identifies the merchant in an application outside the payment processing network. The mobile application (407) is used to provide an account number (302) to a transaction terminal (105) directly or indirectly, while measuring a location (413) of the transaction terminal (105) using a GPS receiver (403). Thus, the measured location (413) of the transaction terminal (105) can be associated with the merchant identifier (411), and after the terminal identifier (401) of the transaction terminal (105) is extracted from the authorization request generated on the transaction terminal (105) using the account number (302), the terminal identifier (401) can be associated with the measured location (413) of the transaction terminal (105) and the merchant identifier (411). The operations can be repeated for different transaction terminals (e.g., 105) to measure their locations (e.g., 413) and to associate their terminal identifiers (401) with the merchant identifier (411). The merchant information (225) may include information such as the business name of the merchant, a street or mailing address of the merchant, online access credential, etc.

The computing apparatus can be further implemented, optionally, to perform other operations discussed below, such as the operations discussed in the section entitled "TRANSACTION DATA BASED SERVICES." Some of the hardware arrangements are discussed in the sections entitled "CENTRALIZED DATA WAREHOUSE" and "HARDWARE."

Transaction Data Based Services

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 1, the system further includes a correlator (117) to correlate user specific advertisement data (119) with transactions resulting from the user specific advertisement data (119). The correlation results (123) can be used by the profile generator (121) to improve the transaction profiles (127).

Figure 2:
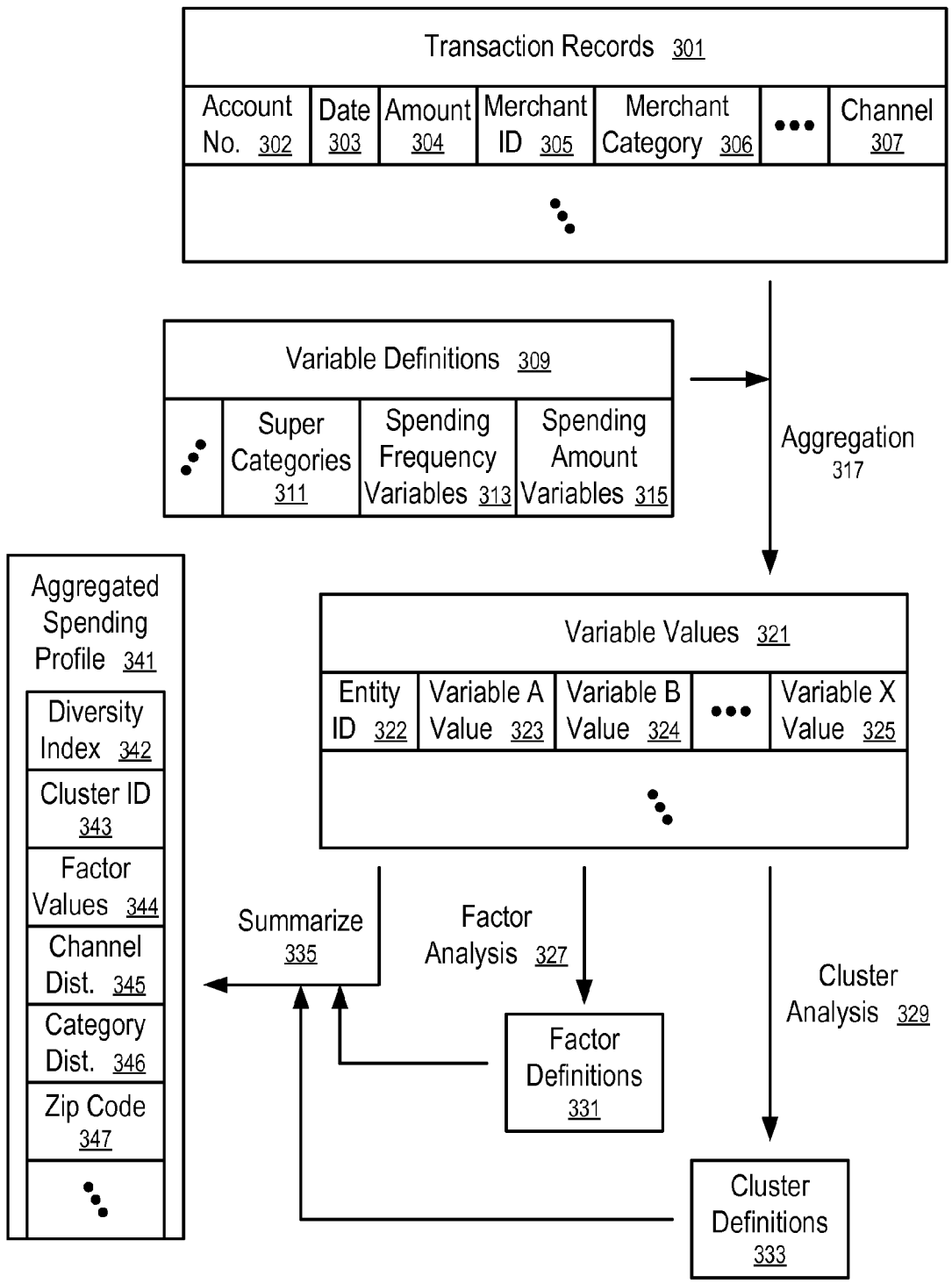
FIG. 2 illustrates the generation of an aggregated spending profile according to one embodiment.
Figure 3:
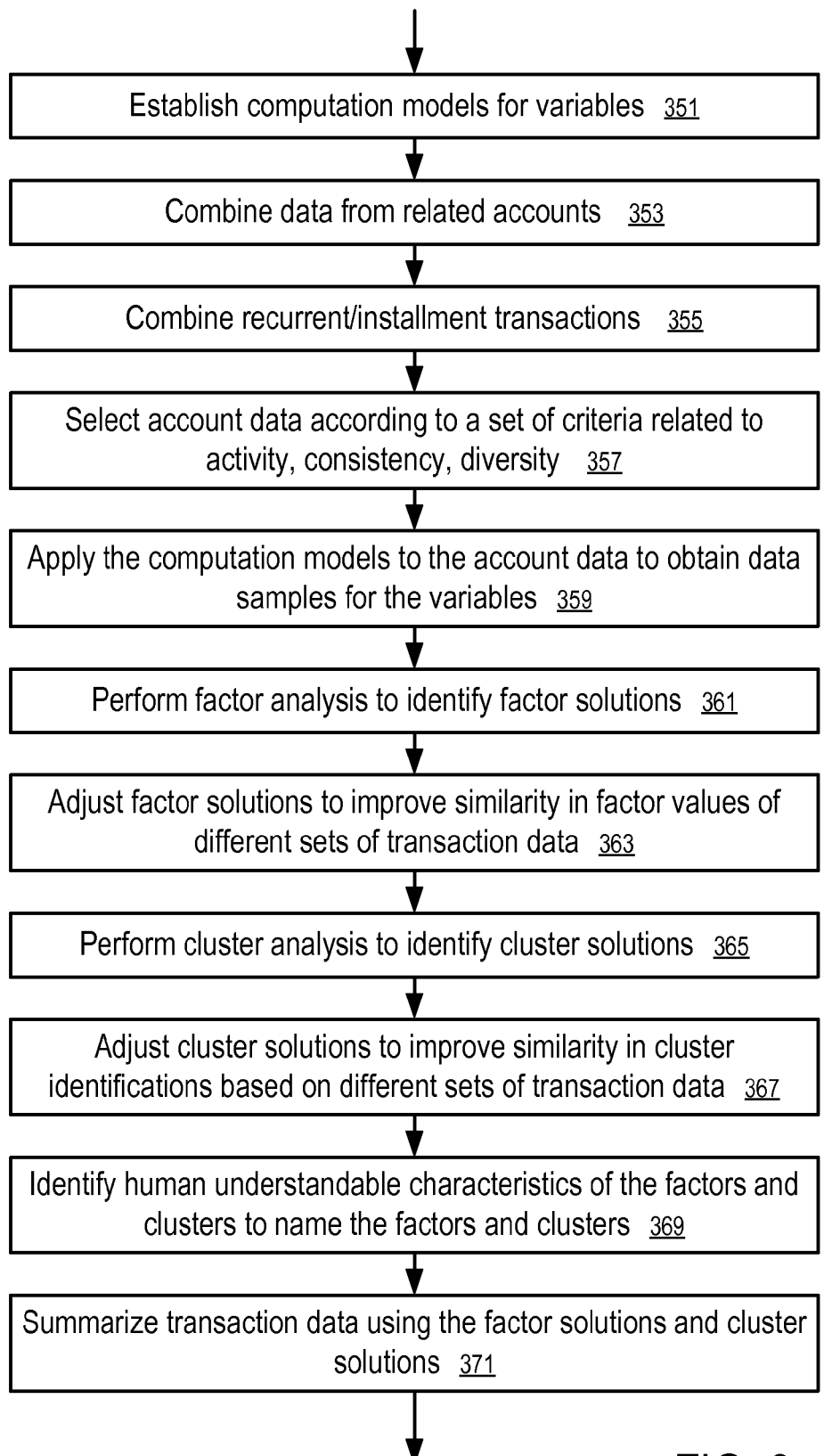
FIG. 3 shows a method to generate an aggregated spending profile according to one embodiment.

The transaction profiles (127) of one embodiment are generated from the transaction data (109) in a way as illustrated in FIGS. 2 and 3. For example, in FIG. 2, an aggregated spending profile (341) is generated via the factor analysis (327) and cluster analysis (329) to summarize (335) the spending patterns/behaviors reflected in the transaction records (301).

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
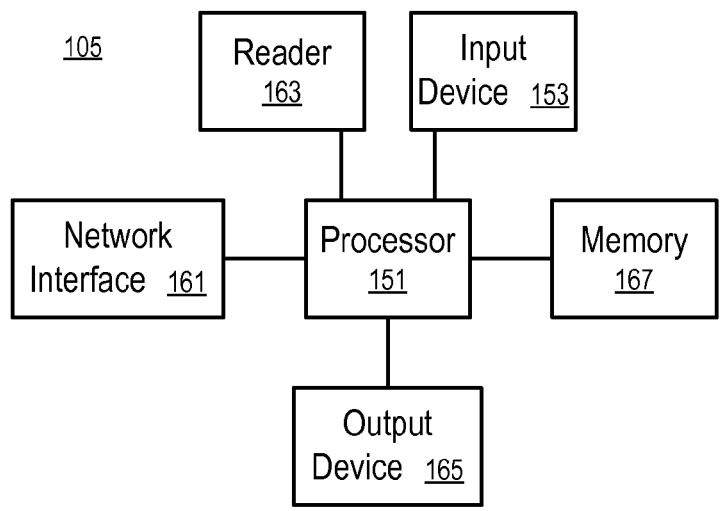
FIG. 5 illustrates a transaction terminal according to one embodiment.
Figure 6:
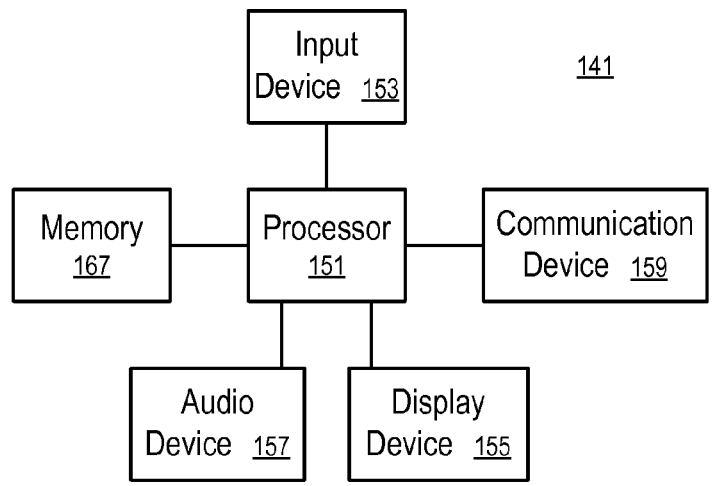
FIG. 6 illustrates an account identifying device according to one embodiment.

FIGS. 5 and 6 illustrate examples of transaction terminals (105) and account identification devices (141). FIG. 7 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 1, 4-7, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009, assigned U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010, assigned U.S. Pat. App. Pub. No. 2010/0280882, and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned U.S. Pat. App. Pub. No. 2008/0319843, and entitled "Supply of Requested Offer Based on Point-of Service to Offeree Distance," U.S. patent application Ser. No. 11/755,575, filed May 30, 2007, assigned U.S. Pat. App. Pub. No. 2008/0300973, and entitled "Supply of Requested Offer Based on Offeree Transaction History," U.S. patent application Ser. No. 11/855,042, filed Sep. 13, 2007, assigned U.S. Pat. App. Pub. No. 2009/0076896, and entitled "Merchant Supplied Offer to a Consumer within a Predetermined Distance," U.S. patent application Ser. No. 11/855,069, filed Sep. 13, 2007, assigned U.S. Pat. App. Pub. No. 2009/0076925, and entitled "Offeree Requested Offer Based on Point-of Service to Offeree Distance," and U.S. patent application Ser. No. 12/428,302, filed Apr. 22, 2009, assigned U.S. Pat. App. Pub. No. 2010/0274627, and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned U.S. Pat. App. Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007, assigned U.S. Pat. App. Pub. No. 2008/0082418, and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185,332, filed Aug. 4, 2008, assigned U.S. Pat. App. Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010, assigned U.S. Pat. App. Pub. No. 2011/0035280, and entitled "Systems and Methods for Targeted Advertisement Delivery," the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, in one embodiment, a first user tracker (113) observes the card number of the user (101) at a particular IP address for a time period identified by a timestamp (e.g., via an online payment process); a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

In one embodiment, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, in one embodiment, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in a query received in the portal (143) matches the IP address previously recorded by the transaction handler (103), the portal (143) determines that the user (101) identified by the IP address in the request is the same user (101) associated with the account of the transaction initiated at the IP address. In one embodiment, a match is found when the time of the query request is within a predetermined time period from the transaction request, such as a few minutes, one hour, a day, etc. In one embodiment, the query may also include a cookie ID representing the user (101). Thus, through matching the IP address, the cookie ID is associated with the account information (142) in a persistent way.

In one embodiment, the portal (143) obtains the IP address of the online transaction directly. For example, in one embodiment, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

In one embodiment, the web browser of the user (101) communicates the user provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

In one embodiment, the portal (143) is configured to identify the consumer account (146) based on the IP address identified in the user data (125) through mapping the IP address to a street address. For example, in one embodiment, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010, assigned U.S. Pat. App. Pub. No. 2011/0093327, and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

The correlator (117) is configured in one embodiment to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010, assigned U.S. Pat. App. Pub. No. 2011/0035278, and entitled "Systems and Methods for Closing the Loop between Online Activities and Offline Purchases," the disclosure of which application is incorporated herein by reference.

Loyalty Program

In one embodiment, the transaction handler (103) uses the account data (111) to store information for third party loyalty programs.

Figure 8:
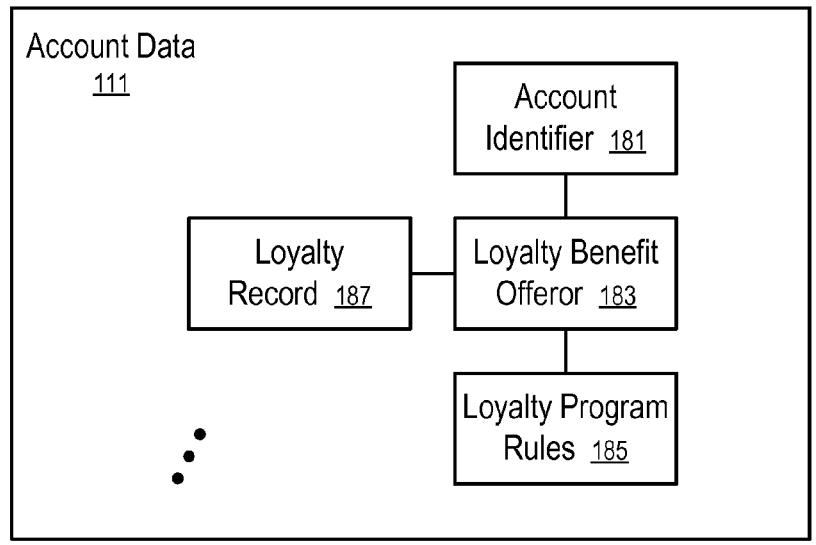
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

In one embodiment, when the account identifier (181) is used to identify the user (101) as a member to access member privileges, the transaction handler (103) stores information about the access of the corresponding member privilege in loyalty record (187). The profile generator (121)

may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

A method to provide loyalty programs of one embodiment includes the use of the transaction handler (103) as part of a computing apparatus. The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program. The computing apparatus provides to a customer (e.g., 101) an offer of a benefit when the customer satisfies a condition defined in the loyalty program, such as the loyalty program rules (185). In one embodiment, the loyalty benefit as identified in the loyalty record (187) can be redeemed in connection with a transaction in a way the benefit of an offer stored in association with the account identifier (181) is redeemed.

Examples of loyalty programs through collaboration between collaborative constituents in a payment processing system, including the transaction handler (103) in one embodiment are provided in U.S. patent application Ser. No. 11/767,202, filed Jun. 22, 2007, assigned U.S. Pat. App. Pub. No. 2008/0059302, and entitled "Loyalty Program Service," U.S. patent application Ser. No. 11/848,112, filed Aug. 30, 2007, assigned U.S. Pat. App. Pub. No. 2008/0059306, and entitled "Loyalty Program Incentive Determination," and U.S. patent application Ser. No. 11/848,179, filed Aug. 30, 2007, assigned U.S. Pat. App. Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned U.S. Pat. App. Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned U.S. Pat. App. Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned U.S. Pat. App. Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned U.S. Pat. App. Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned U.S. Pat. App. Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned U.S. Pat. App. Pub. No. 2010/0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009, assigned U.S. Pat. App. Pub. No. 2010/0114686, and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010, assigned U.S. Pat. App. Pub. No. 2011/0087530, and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

Details on SKU-level profile in one embodiment are provided in U.S. patent application Ser. No. 12/899,144, filed Oct. 6, 2010, assigned U.S. Pat. App. Pub. No. 2011/0093335, and entitled "Systems and Methods for Advertising Services Based on an SKU-Level Profile," the disclosure of which is hereby incorporated herein by reference.

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal (105), or with a delay not long enough to cause the user (101) to have the impression that the message is in response to an action other than the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller (115) to generate, the real-time message to provide the offers (186) to the user (101). For example, the offer (186) may include a discount, incentive, reward, rebate, gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile (341). In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. patent application Ser. No. 13/113,710, filed May 23, 2011 and entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via mobile phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

Figure 10:
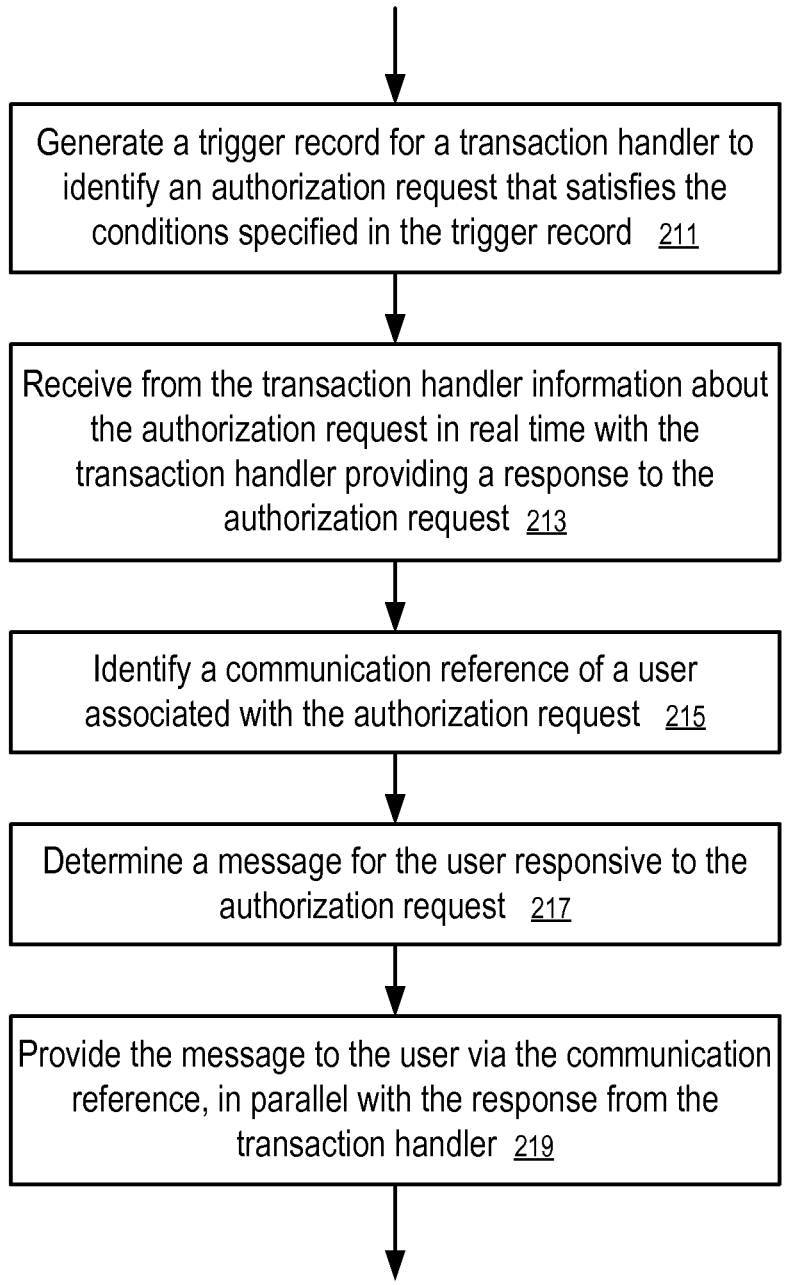
FIG. 10 shows a method to provide real-time messages according to one embodiment.

FIG. 10 shows a method to provide real-time messages according to one embodiment. In FIG. 10, a computing apparatus is to generate (211) a trigger record (207) for a transaction handler (103) to identify an authorization request that satisfies the conditions specified in the trigger record (207), receive (213) from the transaction handler (103) information about the authorization request in real-time with the transaction handler (103) providing a response to the authorization request to a transaction terminal (105), identify (215) a communication reference (205) of a user (101) associated with the authorization request, determine (217) a message for the user (101) responsive to the authorization request, and provide (219) the message to the user (101) at a point of interaction (107) via the communication reference (205), in parallel with the response from the transaction handler (103) to the transaction terminal (105).

Details on real-time messages in one embodiment are provided in U.S. Pat. No. 8,359,274, issued Jan. 22, 2013 and entitled "Systems and Methods to Provide Messages in Real-Time with Transaction Processing," the disclosure of which is hereby incorporated herein by reference.

Merchant Aggregator

In one embodiment, real-time information about transactions is communicated to a remote computing device, such as a merchant aggregator, which has a plurality of merchants as clients. The computing device is connected to the portal (143) of the transaction handler (103) a communication network (e.g., Internet, a wide area network, or a dedicate network) to receive the real-time information and provide services to the merchants and their customers.

In one embodiment, the remote computing device, such as the merchant aggregator, is configured to provide offers (186) to customers (e.g., user (101)) on behalf of the merchants, service loyalty programs on behalf of the merchants, and/or provide rewards to customers (e.g., user (101)) for their interaction with the merchants, etc. The real-time information about the transactions between the merchants and the customers allows the remote computing device to provide new services and improve existing services.

In one embodiment, the computing device remotely connected to the portal (143), such as a merchant aggregator, is configured to enroll merchants and/or customers (e.g., user (101)) to provide services based on the real-time information about transactions between the merchants and the customers (e.g., user (101)). However, the identifiers used by the portal (143) to identify the enrolled merchants are generally different from merchant identifies used by the transaction handler (103) in processing transactions initiated using the transaction terminals (e.g., 105) of the merchants. Thus, the identifiers used by the portal (143) to identify the enrolled merchants may not be sufficient to identify the transactions between the enrolled merchants and the enrolled customers.

In one embodiment, the portal (143) of the transaction handler (103) is configured to match the identities of the merchants as known to the remote computing device, such as the merchant aggregator, with the identities of the merchants as known to the transaction handler (103), to facilitate the monitoring of transactions of the merchants and to generate the real-time information about the transactions between the respective merchants and enrolled customers (e.g., user (101)).

In one embodiment, the portal (143) is configured to link a merchant identifier of a merchant as known to the remote computing device to a merchant identifier of the merchant as known to the transaction handler (103) via a transaction made using a transaction terminal (105) of the merchant. Information about the transaction is communicated between the portal (143) and the remote computing device, in association with the merchant identifier of the merchant as known to the remote computing device, to identify the transaction from the transactions processed the transaction handler (103) and thus link the merchant identifier of the merchant as known to the remote computing device, to the merchant identifier used in the identified transaction.

Alternatively or in combination, the portal (143) is configured to link the merchant identifier of the merchant as known to the remote computing device to the merchant identifier of the merchant as known to the transaction handler (103) based at least in part on marching attributes of the merchant, such as name, address, business category, etc.

For example, when a merchant enrolls or registers with the remote computing device to receive the services of the remote computing device, the remote computing device is configured to collect information about the merchant, such as the business name of the merchant, the street address of the merchant, the business category of the merchant, etc. Such information about the merchant can be matched with the respective merchant information in the data warehouse stored for the merchants as known to the transaction handler (103). Different data fields, such as name, address, business field, may provide partial match for a given merchant identifier of the merchant as known to the remote computing device; and a rule engine is configured in one embodiment to rank the degree of match and select one or more top ranked candidate merchant identifiers, as used in transactions processed by the transaction handler (103).

In one embodiment, a transaction is initiated on a transaction terminal (105) of a merchant as part of the process to register or enroll the merchant for the services of the remote computing device. The transaction is identified as part of information about the merchant, in association with the merchant identifier of the merchant as known to the remote computing device. The merchant identifier used in the transaction is thus linked to the merchant identifier of the merchant as known to the remote computing device. Thus, transactions of the merchant can be monitored using the merchant identifier used in the transaction formed as part of the process to register or enroll the merchant.

In one embodiment, the transaction formed as part of the process to register or enroll the merchant is performed in a predetermined account. The information about the transaction is provided to the portal (143) to allow the portal (143) to identify a transaction record for the transaction, based on attributes such as the date and/or time of the transaction, the transaction amount, an authorization code for the transaction, and a message (e.g., a pseudo-promotional code) transmitted to the transaction handler (103) in an authorization request for the transaction, etc. The portal (143) is configured to identify the transaction record (e.g., 301) of the transaction based on matching the attributes as identified in the information transmitted from the remote computing device to the portal (143).

In one embodiment, the portal (143) is configured to communicate with the remote computing device to determine one or more parameters of the transaction performed on the transaction terminal (105) of a merchant to enroll or register the merchant. Examples of the parameters that can be configured to uniquely identify merchants to be enrolled include transaction amounts, pseudo-promotional code, etc. After one or more parameters are determined to uniquely identify the merchant among a set of merchants currently in the process of being enrolled or registered, the transaction terminal (105) is used to initiate the transaction according to the one or more parameters; and the transaction handler (103) is configured to monitor transactions being processed to detect the transaction initiate the transaction according to the one or more parameters. In response to the detection of authorization request initiated on the transaction terminal (105) of the merchant for the transaction made according to the one or more parameters, the merchant identifier used in the authorization request is extracted and linked to the merchant as registered and/or enrolled.

In one embodiment, enrollment communication between the portal (143) and the remote computing device includes not only the identification information about the merchant, but also the identification information of the transaction terminal (105) used to initiate the transaction designed to register the merchant and/or the transaction terminal (105). In one embodiment, information about the transaction terminal (105) includes an identifier of the transaction terminal (105) (e.g., a serial number), a location of the transaction terminal (105) (e.g., a street address of a retail store in which the transaction terminal (105) is deployed, a GPS position of the transaction terminal (105), a description of the location of the transaction terminal (105) within a retail store in which a plurality of transaction terminals (e.g., 105) of the merchant are located).

In one embodiment, multiple transactions are performed to individually identify the transaction terminals of the merchant. Thus, the transaction handler (103) can monitor the transactions made using specific transaction terminals of the merchant and/or provide information about the transaction terminals on which the monitored transactions are initiated.

In one embodiment, when an authorization request for a transaction made using the one or more parameters assigned to uniquely identify the merchant and/or the transaction terminal (105) of the merchant is detected, the transaction handler (103) is configured to communicate with the portal (143) to provide a response to indicate the detection of the transaction. For example, in one embodiment, the transaction handler (103) is configured to provide an indication via the authorization response to indicate the recognition of the merchant and/or the transaction terminal (105). For example, in one embodiment, the portal (143) is configured to provide a message to the remote computing device to indicate the successful detection of transaction associated with the merchant and/or the transaction terminal (105) and completion of the registration or enrollment process.

FIG. 11 shows a system configured to communicate via a merchant aggregator according to one embodiment. In FIG. 11, the merchant aggregator (221) is configured to communicate with merchants (227) to enroll the merchants (227) for the services of the system.

In one embodiment, when the merchant aggregator (221) enrolls a new merchant, the merchant aggregator provides merchant information (225) to the portal (143) of the transaction handler (103) to request the portal (143) and/or the transaction handler (103) to monitor the transactions of the respective merchant (227).

In one embodiment, the merchant information (225) used by the merchant aggregator (221) to identify the merchant (227) may include the business data (e.g., corporation data, corporation name, consumer-facing name, "doing business as" names, names of affiliates and/or subsidiaries), addresses and store locations, etc. of the merchant (227). In one embodiment, the merchant information (225) further includes information about the acquirer representing the merchant, merchant category, and/or other relevant information that is helpful in identifying the merchant in the transaction processing network having the transaction handler (103) interconnecting acquirer processors (e.g., 147) operated by acquirers representing respective merchants and issuer processors (e.g., 145) operated by issuers representing respective users (101) of consumer accounts (146).

For example, in one embodiment, the merchant aggregator (221) provides the merchant information (225) via a spreadsheet identifying a list of merchants (227). In the spreadsheet, each merchant (227) is identified via the corporate name of the merchant (227) and the consumer-facing name of the merchant. For less well known merchants (e.g., small businesses), the spreadsheet further identifies the name of the acquiring bank that represents the merchant (227) in processing transactions to be processed via the transaction handler (103). In one embodiment, the spreadsheet further includes the desired starting date of monitoring the transactions of the merchants (227) identified in the spreadsheet and the expected ending date of monitoring the transactions of the merchant (227) for the merchant aggregator (221).

In one embodiment, the portal (143) is configured to provide a user interface that allows the merchant aggregator (221) to specify data for the creation of the trigger records (207) associated with an offer campaign. For example, the user interface in one embodiment allows the merchant aggregator (221) to create an offer campaign associated with one of the merchants (227) identified in the spreadsheet provided to identify the merchants (227). To support the offer campaign, the user interface is configured to allow the merchant aggregator (221) to specify rules to monitor the transactions of the respect merchant (227). For example, the rules may identify a date to start testing of the monitoring of the transactions of the merchant (227), a date to send the monitoring of the transactions of the merchant (227) for the purpose of the offer campaign, a request for a notification of transactions provided in real time as the processing of the authorization requests of the respective transactions of the merchant (227), and/or a request for a notification of transactions provided in real time as the processing of the settlement requests of the respective transactions of the merchant (227). In one embodiment, the user interface further allows the merchant aggregator (221) to specify other requirements to select transactions to be monitored, such as requirements based on transaction amount, transaction time, characteristics of the user (101) purchasing from the merchant (227), etc. In one embodiment, the user interface further allows the merchant aggregator (221) to specify messages to be transmitted, in a way as illustrated in FIG. 9, to the respective user (101) transacting with the merchant (227), in response to the transactions detected according to the offer rules.

In one embodiment, the portal (143) is configured to correctly identify transactions associated with the enrolled merchant (227) based on the merchant information (225), and calculate the location of the transactions to enable location based services associated with the offer (186) of the merchant (227).

In one embodiment, based on the merchant information (225), the portal (143) is configured to identify one or more merchant IDs (305) that are configured to be used in authorization requests for transactions of the merchant (227) identified by the merchant information (225). The identified merchant ID (305) is used to generate the trigger records (207) for monitoring the transactions of the merchant (227) identified by the merchant information (225) provided by the merchant aggregator (221).

In one embodiment, the account holders (e.g., user (101)) are required to enroll with the system to provide the consent for the media controller (115) to send the transaction information of the account holders (e.g., user (101)) to the merchant aggregator (221), and for the media controller (115) and/or the merchant aggregator (221) to send messages to the point of interaction (107) of the user (101) based on the transaction information.

In FIG. 11, after user enrollment, the user (101) of the consumer account (146) is identified to be associated with a user ID (223) used by the merchant aggregator (221) to identify the user (101). The user (101) may further provide the communication reference (205) to the merchant aggregator (221) to receive offers (186), rewards, notifications, alerts, etc. The transaction handler (103) is configured to use the trigger records (207) containing the account number (302) of the user (101) to detect the transactions of the user (101) (e.g., the transactions between the user (101) between one or more the enrolled merchants (e.g., 227)).

To associate the account number (302) with the user ID (223) in one embodiment, the account number (302) of the consumer account (146) of the user (101) is identified to the portal (143) during the user enrollment and stored in the data warehouse (149) in association with the user ID (223).

For example, during the user enrollment process, the point of interaction (107) (e.g., a web browser, a mobile phone) of the user (101) interacting with the merchant aggregator (221) is redirected in one embodiment from the merchant aggregator (221) to the portal (143) with a reference to the user ID (223); and in response, the portal (143) provides a user interface to the point of interaction (107) of the user (101) to specify the account number (302). After the account number (302) specified by the user (101) is validated and/or authenticated (e.g., via security code, person identification number, security questions, security devices, etc.), the account number (302) is associated with the user ID (223) in the data warehouse (149) of the transaction handler (103).

In one embodiment, more than one account number (302) of the consumer accounts (146) of the user (101) can be associated with the single user ID (223) used by the merchant aggregator (221) to represent the user (101).

In one embodiment, the user ID (223) is assigned to the user (101) by the merchant aggregator (221) during the enrollment process. Alternatively, the portal (143) may generate and assign the user ID (223) for the user during the enrollment process and provide the user ID (223) to the merchant aggregator (221) to complete the enrollment of the user (101).

In one embodiment, during the enrollment process, the user (101) provides the account number (302) to the merchant aggregator (221), which indicates the association between the account number (302) and the user ID (223) to the portal (143) of the transaction handler (103); and the user ID (223) is subsequently used to identify the user (101) is messages to the merchant aggregator (221). Alternatively, the account number (302) may be used directly to identify the user (101), when the real-time message from the media controller (115) to the merchant aggregator (221) is transmitted over a secure communication channel.

In one embodiment, the trigger record (207) is generated based at least in part on the account number (302) and the merchant ID (305) to monitor the transactions between the user (101) and the merchant (227). When the authorization request from the transaction terminal (105) of the merchant (227) identifies the account number (302) and the merchant ID (305), as required by the trigger record (207) (and satisfies other requirements of the trigger record (207), such as requirements related to the date and time of the transaction, the amount of the transaction, etc.), the transaction handler (103) causes the message broker (201) to generate a message and transmit the message to the merchant aggregator (221), in real time with the processing of the transaction, to inform the merchant aggregator (221) of the transaction.

In one embodiment, the data warehouse (149) stores the merchant location (229) for the merchant ID (305) associated with the transaction terminal (105).

In one embodiment, in response to the authorization request from the transaction terminal (105), the merchant location (229) of the transaction terminal (105) is determined and included in the real-time message generated by the message broker (201) and provided to the merchant aggregator (221) in a generic, machine-readable format (e.g., XML). Based on the information provided in the real-time message, the merchant aggregator (221) may use the communication reference (205) to communicate offers (186), rewards, messages, notifications, alerts, etc. to the point of interaction (107) of the user (101), such as via messages to a mobile phone identified by the communication reference (205) and/or a mobile application running on the mobile phone of the user (101).

In FIG. 11, the merchant aggregator (221) is configured to communicate with the point of interaction (107) of the user (101) in response to the real-time message from the media controller (115). Alternatively or in combination, the data warehouse (149) may store the communication reference (205), which is used by the media controller (115) to provide one or more separate real-time messages related to location-based offers (186) to the point of interaction (107) of the user (101) without going through the merchant aggregator (221).

In one embodiment, a merchant (227) may have a number of subsidiaries with different names and locations. In response to the merchant information (225), merchant data related to merchant accounts (148) are searched to identify a set of possible matches to the merchant information (225), which may be further communicated to the merchant aggregator (221) for confirmation. For example, in one embodiment, each matched merchant ID is augmented with the respective address of the transaction terminals operated by the respective merchant entity; and the merchant (227) may further confirm the enrollment of the respective merchant entity. In one embodiment, the names and addresses of the merchant information (225) are matched with the names and addresses of the merchant data for merchant accounts (148) to identify the merchant entity that is enrolled via the merchant information (225).

In one embodiment, a plurality of merchant IDs (305) may match the merchant information (225) specified by the merchant aggregator (221); and one or more merchant locations corresponding to the locations of the transaction terminals (105) may associate with a merchant ID (305) in the data warehouse (149). When the trigger record (207) matches a transaction, the merchant location (229) corresponding to the transaction terminal (105) from which the authorization request is received is used for the location-based service provided by the merchant aggregator (221) and/or the message broker (201).

Figure 12:
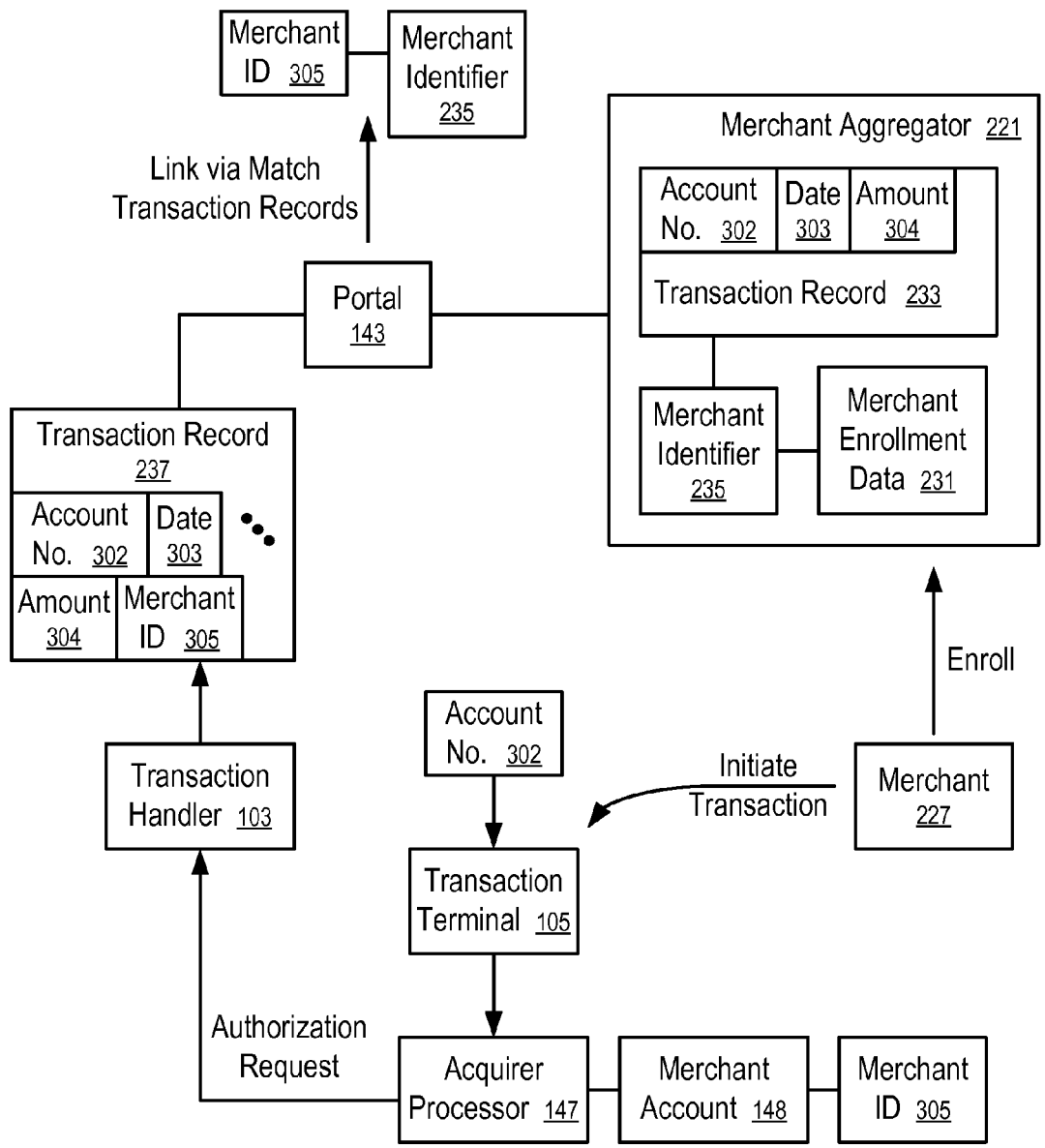
FIG. 12 shows a system to enroll a merchant according to one embodiment.

FIG. 12 shows a system to enroll a merchant according to one embodiment. In FIG. 12, a transaction made using a predetermined account number (302) is used to correlate the merchant information (225) (e.g., a merchant identifier (235) of the merchant as known to the merchant aggregator (221)) with the merchant ID (305) used in the transaction messages processed by the transaction handler (103).

In FIG. 12, when the merchant (227) enrolls with the merchant aggregator (221), the merchant enrollment data (231), including the merchant information (225), is generated to identify the names and locations of the enrolled merchant (227). The merchant aggregator (221) uses the merchant identifier (235) to represent the enrolled merchant (227).

In one embodiment, to correlate the merchant identifier (235) with a merchant ID (305) associated with the merchant account (148), the transaction terminal (105) at the enrolled location of the merchant (227) is used to initiate a transaction using a predetermined account number (302). After the transaction is initiated, the acquirer processor (147) connected to the transaction terminal (105) provides the authorization request to the transaction handler (103), which stores the transaction record (237) that includes the predetermined account number (302), the merchant ID (305), the date (303) of the transaction, the amount (304) of the transaction, the authorization code provided by the transaction handler (103), through the acquirer processor (147), to the transaction terminal (105) for the transaction, etc.

In one embodiment, the merchant aggregator (221) stores a separate transaction record (233) including certain information about the transaction as identified by the enrolling merchant (227), such as the predetermined account number (302), the date (303) (or the time period in which transaction is performed), the amount (304), and the authorization code received by the transaction terminal (105), through the acquirer processor (147) and the transaction handler (103), for the transaction, etc.

In FIG. 12, the portal (143) is configured to match the transaction records (233 and 237) to link the merchant ID (305) to the merchant identifier (235), using one or more sets of corresponding fields of the transaction records (233 and 237).

For example, during the enrollment period, the portal (143) is configured to retrieve transactions records (237) for the predetermined account number (302) from the data warehouse (149); and the merchant aggregator (221) is configured to provide its transaction record (233) with the merchant identifier (235) to the portal (143). The portal (143) is configured to match the transaction records (233 and 237) based on the account number (302), the transaction date (303), and/or the transaction amount (304). When a match is detected, the merchant ID (305) (and the identifier of the transaction terminal (105)) from the transaction record (237) generated by the transaction handler (103) is linked to the merchant identifier (235) associated with the transaction record (233) stored by the merchant aggregator (221).

Using the system of FIG. 12, the merchant (227) can selectively enroll certain transaction terminals (105) operated under certain names and/or at certain locations. Thus, the merchant (227) may enroll a portion of the transaction terminals (105) under the control of the merchant (227) but not another portion of the transaction terminals (105) under the control of the merchant (227). Different transaction terminals e.g., 105) of a merchant may have different merchant ID (305) and/or transaction terminal IDs. Through transactions initiated using the different transaction terminals of the merchant, the merchant identifier (235) representing an enrolled merchant is linked to the different merchant ID (305) and/or transaction terminal IDs as used in authorization request for the transactions made using respective transaction terminals of the corresponding enrolled merchant.

In one embodiment, the transaction record (233) further includes the location information of the transaction terminal (105), which can be used for location based services. For example, in reporting the transaction initiated via using the predetermined account number (302) at the transaction terminal (105), the merchant (227) may specify the location of the transaction terminal (105) via a mobile device, a mobile application, a map application, or a street address. Thus, the location of the transaction terminal (105) is associated with the merchant ID (305) and/or the transaction terminal (105).

In one embodiment, the data warehouse (149) stores location information of transaction terminal (105) (e.g., as reported by the acquirer processor (147)) and provides the location information to the merchant aggregator (221) after the merchant ID (305) is linked to the merchant identifier (235) via the transaction record (237) for the transaction initiated on the transaction terminal (105).

In one embodiment, during the enrollment process, the merchant aggregator (221) instructs the merchant (227) to perform the transaction according to the data stored in the transaction record (223) and provides the transaction record (233) to the portal (143). In response, the portal (143) generates a trigger record (207) to detect the transaction that is subsequently initiated by the merchant at the transaction terminal (105). In one embodiment, the trigger record (207) is configured to cause the portal (143) to link the merchant ID (305) from the transaction record (237) of the identified transaction with the merchant identifier (235) associated with the transaction record (233) used to generate the trigger record (207).

In one embodiment, during the enrollment process, the merchant aggregator (221) is configured to request the portal (143) to generate a set of transaction parameters to temporarily identify a transaction terminal (105) of a merchant (227). The portal (143) is configured to transmit the parameters to the merchant aggregator as part of the transaction record (233) for initiation of the transaction. Examples of the parameters include the transaction amount, a pseudo-promotional code to be transmitted in an authorization request initiated in the transaction terminal (105). After the parameters are transmitted to the merchant aggregator (221), the transaction handler (103) is configured to monitor transactions to detect the transaction made, in the predetermined account, using the parameters provided to the merchant aggregator (221). Thus, as soon as the authorization request for the expected transaction reaches the transaction handler (103), the portal (143) can identify the merchant ID (305) and/or the transaction terminal ID of the respective transaction terminal (105) from the received authorization request, for association with the transaction terminal (105) of the merchant (227) to be enrolled.

In one embodiment, the transaction handler (103) is configured to monitor and detect a plurality of transactions initiated to enroll a plurality of different merchants and/or different transaction terminals of the enrolled merchants. To separately identify the merchants and/or the transaction terminals, the portal (143) and/or the merchant aggregator (221) are configured to select the transaction parameters (e.g., transaction amounts) as temporary unique identifiers of the merchants and/or transaction terminals. A data warehouse (e.g., 149) is configured to store data associating the temporary unique identifiers with the merchants and/or transaction terminals. After a transaction is performed and detected, the temporary association between the corresponding transaction parameters with the merchants and/or transaction terminals can be removed and/or reused for the identification of further merchants and/or transaction terminals.

In one embodiment, the transaction parameters configured as temporary identifiers of the enrolled merchants and/or transaction terminals are used to create trigger records to detect the subsequent authorization requests initiated from the corresponding transaction terminals of the enrolled merchants.

Figure 13:
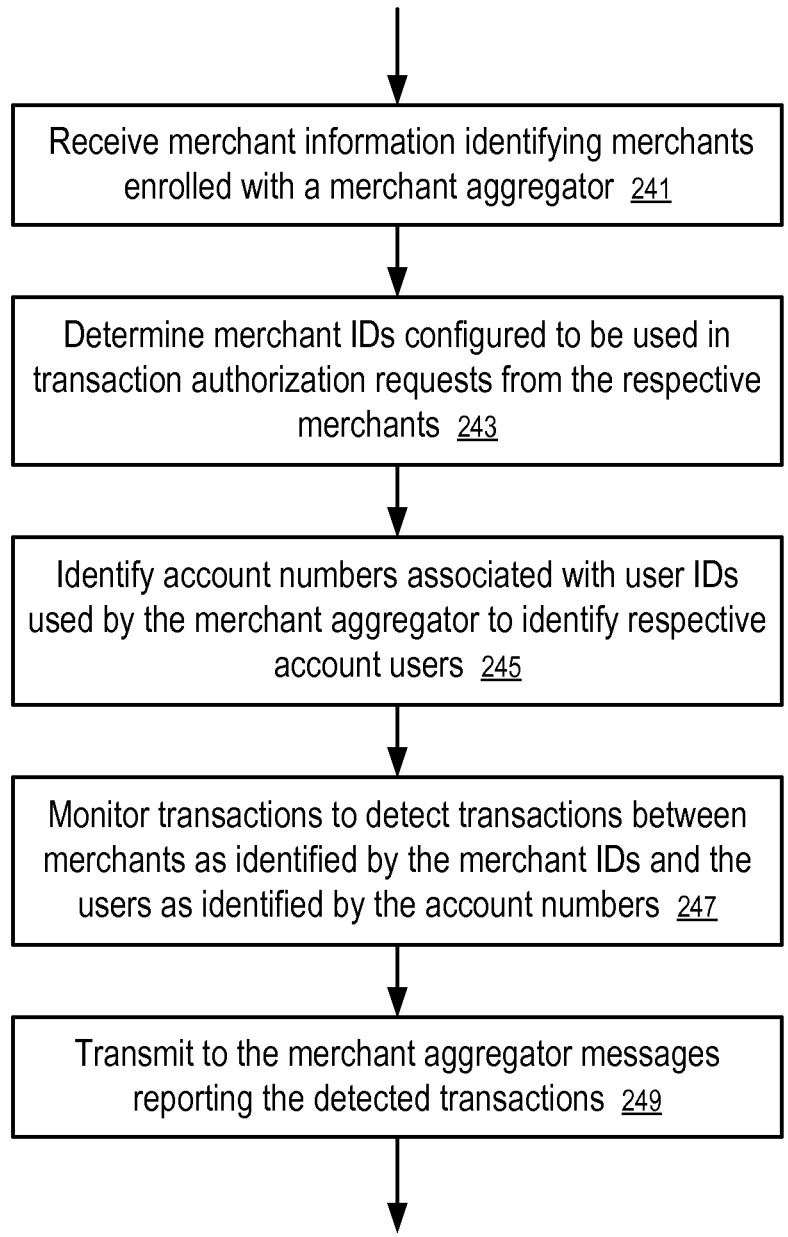
FIG. 13 shows a method to provide real-time notifications of transactions according to one embodiment.

FIG. 13 shows a method to provide real-time notifications of transactions according to one embodiment. In FIG. 13, a computing apparatus is configured to receive (241) merchant information (225) identifying merchants (227) enrolled with a merchant aggregator (221), determine (243) merchant IDs (305) configured to be used in transaction authorization requests from the respective merchants (227), identify (245) account numbers (302) associated with user IDs (223) used by the merchant aggregator (221) to identify respective account users (101), monitor (247) transactions processed by the transactions handler (103) to detect transactions between merchants (227) as identified by the merchant IDs (305) and the users (101) as identified by the account numbers (302), and transmit (249) to the merchant aggregator (221) messages reporting the detected transactions.

Some details about enrolling a merchant for communication via a merchant aggregator can be found in U.S. patent application Ser. No. 13/624,778, filed Sep. 21, 2012, assigned U.S. Pat. App. Pub. No. 2013/0073464, and entitled "Systems and Methods to Communicate via a Merchant Aggregator", the entire disclosure of which is incorporated herein by reference.

Variations

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010, assigned U.S. Pat. App. Pub. No. 2010/0174623, and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In FIG. 2, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

A "card-present" transaction typically involves physically presenting the account identification device (141), such as a financial transaction card, to the merchant (e.g., via swiping a credit card at a POS terminal of a merchant); and a "card-not-present" transaction typically involves presenting the account information (142) of the consumer account (146) to the merchant to identify the consumer account (146) without physically presenting the account identification device (141) to the merchant or the transaction terminal (105).

The transaction records (301) of one embodiment may further include details about the products and/or services involved in the purchase.

When there is voluminous data representing the transaction records (301), the spending patterns reflected in the transaction records (301) can be difficult to recognize by an ordinary person.

In FIG. 2, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAILS) code, or a similarly standardized category code). In other embodiments, an area may be identified by a product category, a SKU number, etc.

Examples of the spending frequency variables (313) and spending amount variables (315) defined for various merchant categories (e.g., 306) in one embodiment are provided in U.S. patent application Ser. No. 12/537,566, filed Aug. 7, 2009, assigned U.S. Pat. App. Pub. No. 2010/0306029, and entitled "Cardholder Clusters," and in U.S. patent application Ser. No. 12/777,173, filed May 10, 2010, assigned U.S. Pat. App. Pub. No. 2010/0306032, and entitled "Systems and Methods to Summarize Transaction Data," the disclosures of which applications are hereby incorporated herein by reference.

In FIG. 2, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

The transaction records (301) can be aggregated according to a buying entity, or a selling entity. For example, the aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular merchant having transactions with multiple accounts can be aggregated for a merchant level analysis. For example, the transaction records (301) for a particular merchant group can be aggregated for a merchant group level analysis. The aggregation (317) can be formed separately for different types of transactions, such as transactions made online, offline, via phone, and/or "card-present" transactions vs. "card-not-present" transactions, which can be used to identify the spending pattern differences among different types of transactions.

In FIG. 2, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

In FIG. 2, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In FIG. 2, a factor analysis (327) is performed to reduce the redundancy and/or correlation among the variables (e.g., 313, 315). The factor analysis (327) identifies the definitions (331) for factors, each of which represents a combination of the variables (e.g., 313, 315). A factor from the factor analysis (327) is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In general, an aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353); recurrent/installment transactions are combined (355); and account data are selected (357) according to a set of criteria related to activity, consistency, diversity, etc.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109).

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

Optionally, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Details about aggregated spending profile (341) in one embodiment are provided in U.S. patent application Ser. No. 12/777,173, filed May 10, 2010, assigned U.S. Pat. App. Pub. No. 2010/0306032, and entitled "Systems and Methods to Summarize Transaction Data," the disclosure of which is hereby incorporated herein by reference.

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. patent application Ser. No. 13/675,301, filed Nov. 13, 2012 and entitled "Systems and Methods to Summarize Transaction data," the disclosure of which is hereby incorporated herein by reference.

Transaction Processing and Data

FIG. 4 shows a system to provide information and/or services based on transaction data (109) according to one embodiment.

In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile (341), offer redemption notification, etc. The portal (143) may be implemented as a web portal, a telephone gateway, a file/data server, etc.

In FIG. 4, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 4, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 4, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 4, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned U.S. Pat. App. Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. The transaction terminal (105) illustrated in FIG. 5 can be used in various systems discussed in connection with other figures of the present disclosure. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 7. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system, comprising:
at least one microprocessor; and
memory coupled with the at least one microprocessor and storing instructions configured to instruct the at least one microprocessor to at least:
communicate, via a portal, with a mobile application executing in a mobile device, the mobile application configured to:
receive a merchant identifier from a merchant;
authenticate the merchant represented by the merchant identifier;

provide the merchant identifier from the mobile application to the portal;

cause the portal to identify an account number for initiation of a transaction on a transaction terminal of the merchant; and obtain the account number from a communication from the portal to the mobile application, wherein the communication is performed using a communication channel outside of an electronic payment processing network having a transaction handler and the transaction is initiated on the transaction terminal using the account number;

associate, in a data warehouse coupled with the portal and the transaction handler:

the account number provided by the portal to the mobile application in the communication, and the merchant identifier provided by the mobile application;

communicate with the transaction handler of the electronic payment processing network to identify, based at least in part on the account number identified in the communication between the portal and the mobile application, the transaction initiated on the transaction terminal in the electronic payment processing network;

extract, from a record of the transaction initiated on the transaction terminal using the account number, terminal information configured to identify the transaction terminal in records of transactions initiated on the transaction terminal, wherein the record of the transaction includes the account number; and associate, in the data warehouse coupled with the portal and the transaction handler, based on association of the account number and the merchant identifier in the data warehouse and association of the terminal information and the account number included in the record of the transaction:

merchant information corresponding to the merchant identifier, and the terminal information extracted from the record of the transaction initiated using the account number identified in the communication between the portal and the mobile application.

2. The computing system of claim 1, wherein the merchant information includes location information of the transaction terminal.

3. The computing system of claim 2, further comprising: extract, from the record of the transaction, the location information of the transaction terminal.

4. The computing system of claim 2, wherein the location information is identified by the mobile application executing in the mobile device.

5. The computing system of claim 4, wherein the location information is identified by the mobile application executing in the mobile device using a global positioning system (GPS) receiver.

6. The computing system of claim 5, wherein the mobile device is configured to present the account number on a display device and determine a position of the mobile device while the account number is presented on the display device; and the location information includes the position determined while the account number is presented on the display device.

7. The computing system of claim 2, wherein the mobile device is configured to communicate the account number to the transaction terminal.

8. The computing system of claim 7, wherein the mobile device is configured to determine a position of the mobile device as the location information of the transaction terminal while the mobile device and the transaction terminal are in communication range for near field communication.

9. The computing system of claim 1, wherein the account number is a one-time account number valid for one time use on the transaction terminal.

10. A non-transitory computer storage medium storing instructions configured to instruct a computing device to at least:

communicate, via a portal, with a mobile application executing in a mobile device, the mobile application configured to:

receive a merchant identifier from a merchant;

authenticate the merchant represented by the merchant identifier;

provide the merchant identifier from the mobile application to the portal;

cause the portal to identify an account number for initiation of a transaction on a transaction terminal of the merchant; and obtain the account number from a communication from the portal to the mobile application, wherein the communication is performed using a communication channel outside of an electronic payment processing network having a transaction handler and the transaction is initiated on the transaction terminal using the account number;

associate, in a data warehouse coupled with the portal and the transaction handler:

the account number provided by the portal to the mobile application in the communication, and the merchant identifier provided by the mobile application;

communicate with the transaction handler of the electronic payment processing network to identify, based at least in part on the account number identified in the communication between the portal and the mobile application, the transaction initiated on the transaction terminal in the electronic payment processing network;

extract, from a record of the transaction initiated on the transaction terminal using the account number, terminal information configured to identify the transaction terminal in records of transactions initiated on the transaction terminal, wherein the record of the transaction includes the account number; and associate, in the data warehouse coupled with the portal and the transaction handler, based on association of the account number and the merchant identifier in the data warehouse and association of the terminal information and the account number included in the record of the transaction:

merchant information corresponding to the merchant identifier, and the terminal information extracted from the record of the transaction initiated using the account number identified in the communication between the portal and the mobile application.

11. The computer storage medium of claim 10, wherein the account number is valid for one time use within a predetermined period of time on the transaction terminal.

12. The computer storage medium of claim 10, wherein the mobile application is configured to present the account number on a display device and determine a position of the mobile device as location information of the transaction terminal while the mobile account number is presented on the display device.

13. The computer storage medium of claim 10, wherein the instructions are further configured to instruct the computing device to:
   extract, from the record of the transaction, the location information of the transaction terminal determined by the mobile application; and
   store data associating the location information of the transaction terminal in association with the terminal information extracted from the record of the transaction.

14. The computer storage medium of claim 10, wherein the mobile device includes a near field communication device configured to communicate the account number to the transaction terminal to initiate the transaction.

15. A method, comprising:
   communicating, via a portal, with a mobile application executing in a mobile device, the mobile application configured to:
      receive a merchant identifier from a merchant;
      authenticate the merchant represented by the merchant identifier;
      provide the merchant identifier from the mobile application to the portal;
      cause the portal to identify an account number for initiation of a transaction on a transaction terminal of the merchant; and
      obtain the account number from a communication from the portal to the mobile application, wherein the communication is performed using a communication channel outside of an electronic payment processing network having a transaction handler and the transaction is initiated on the transaction terminal using the account number;
   associating, in a data warehouse coupled with the portal and the transaction handler:
      the account number provided by the portal to the mobile application in the communication, and
      the merchant identifier provided by the mobile application;
   communicating with the transaction handler of the electronic payment processing network to identify, based at least in part on the account number identified in the communication between the portal and the mobile application, the transaction initiated on the transaction terminal in the electronic payment processing network;
   extracting, from a record of the transaction initiated on the transaction terminal using the account number, terminal information configured to identify the transaction terminal in records of transactions initiated on the transaction terminal, wherein the record of the transaction includes the account number; and
   associating, in the data warehouse coupled with the portal and the transaction handler, based on association of the account number and the merchant identifier in the data warehouse and association of the terminal information and the account number included in the record of the transaction:
      merchant information corresponding to the merchant identifier, and
      the terminal information extracted from the record of the transaction initiated using the account number identified in the communication between the portal and the mobile application.

16. The method of claim 15, further comprising:
   communicating the account number via the mobile device to the transaction terminal for initiation of an authorization request for the transaction.

17. The method of claim 16, wherein the mobile device is configured to communicate the account number to the transaction terminal via near field communication.

18. The method of claim 15, wherein the account number is valid within a predetermined period of time after the account number is received from the portal.

19. The method of claim 15, wherein the merchant information includes location information of the transaction terminal identified via the mobile application executing in the mobile device.

* * * * *